US012458966B2

(12) United States Patent
Ziemba et al.

(10) Patent No.: US 12,458,966 B2
(45) Date of Patent: Nov. 4, 2025

(54) MICROFLUIDIC ARRAY, METHOD OF MANUFACTURE, MEASURING SYSTEM COMPRISING THE MICROFLUIDIC ARRAY, AND USE

(71) Applicants: LEONHARD KURZ Stiftung & Co. KG, Fürth (DE); OVD Kinegram AG, Zug (CH); Stratec Consumables GmbH, Anif (AT)

(72) Inventors: Sabine Ziemba, Nuremberg (DE); Michael Scharfenberg, Nuremberg (DE); Violetta Olszowka, Zirndorf (DE); Martina Schmidt, Nuremberg (DE); Juri Attner, Unterägeri (CH); Markus Bigler, Hochdorf (CH); Sascha Mario Epp, Steinhausen (CH); Martin Richner, Auw (CH); Maria Bauer, Salzburg (AT); Gottfried Reiter, Adnet (AT); Georg Bauer, Salzburg (AT)

(73) Assignees: LEONHARD KURZ Stiftung & Co. KG, Fürth (DE); OVD Kinegram AG, Zug (CH)

( * ) Notice: Subject to any disclaimer, the term of this patent is extended or adjusted under 35 U.S.C. 154(b) by 823 days.

(21) Appl. No.: 17/610,306

(22) PCT Filed: Mar. 11, 2020

(86) PCT No.: PCT/EP2020/056465
§ 371 (c)(1),
(2) Date: Nov. 10, 2021

(87) PCT Pub. No.: WO2020/229016
PCT Pub. Date: Nov. 19, 2020

(65) Prior Publication Data

US 2022/0241781 A1 Aug. 4, 2022

(30) Foreign Application Priority Data

May 10, 2019 (DE) ..................... 10 2019 112 254.6
Dec. 23, 2019 (DE) ..................... 10 2019 135 764.0

(51) Int. Cl.
*B01L 3/00* (2006.01)

(52) U.S. Cl.
CPC . *B01L 3/502707* (2013.01); *B01L 2300/0887* (2013.01); *B01L 2300/123* (2013.01); *B01L 2300/168* (2013.01); *B01L 2400/0406* (2013.01)

(58) Field of Classification Search
CPC ....... B01L 3/502707; B01L 2300/0887; B01L 2300/123; B01L 2300/168; B01L 2400/0406
See application file for complete search history.

(56) References Cited

U.S. PATENT DOCUMENTS 8,133,671 B2 3/2012 Williams et al.
8,220,704 B2 7/2012 Atkin et al.
(Continued)

FOREIGN PATENT DOCUMENTS

CN 111468018 A 7/2020
DE 102004042111 A1 3/2006
(Continued)

OTHER PUBLICATIONS

Japanese Office Action dated Aug. 27, 2024.
(Continued)

*Primary Examiner* — Jill A Warden
*Assistant Examiner* — Alex Ramirez
(74) *Attorney, Agent, or Firm* — Hoffmann & Baron, LLP

(57) ABSTRACT

A microfluidic array, a method for producing same, a measuring system comprising the microfluidic array, and a use.

28 Claims, 3 Drawing Sheets

(56) References Cited

U.S. PATENT DOCUMENTS

| | | | | |
|---|---|---|---|---|
| 8,349,274 | B2 | 1/2013 | Prins et al. | |
| 8,603,384 | B2 | 12/2013 | Lüttge et al. | |
| 2003/0008411 | A1 | 1/2003 | Van Dam et al. | |
| 2004/0086424 | A1 * | 5/2004 | Schembri | B01L 3/505 422/504 |
| 2006/0243380 | A1 | 11/2006 | Boehm et al. | |
| 2008/0095986 | A1 | 4/2008 | Schilling et al. | |
| 2008/0205017 | A1 | 8/2008 | Nellissen et al. | |
| 2009/0054264 | A1 | 2/2009 | Ugolin et al. | |
| 2009/0291264 | A1 | 11/2009 | Akai et al. | |
| 2010/0304306 | A1 | 12/2010 | Blanco Barro et al. | |
| 2019/0070606 | A1 | 3/2019 | Li et al. | |
| 2019/0091649 | A1 | 3/2019 | Priewasser et al. | |

FOREIGN PATENT DOCUMENTS

| | | | |
|---|---|---|---|
| DE | 10 2015 015 535 | A1 | 6/2017 |
| DE | 10 2017 217 179 | | 3/2019 |
| DE | 10 2017 217 179 | A1 | 3/2019 |
| EP | 1790704 | A1 | 5/2007 |
| JP | 2005-349500 | A | 12/2005 |
| JP | 2005-351774 | A | 12/2005 |
| JP | 2009-503489 | A | 1/2009 |
| JP | 2009-524170 | A | 6/2009 |
| JP | 2009-528513 | A | 8/2009 |
| JP | 2011-513082 | A | 4/2011 |
| JP | 2011-101881 | A | 5/2011 |
| JP | 2012-504487 | A | 2/2012 |
| JP | 2013-043934 | A | 3/2013 |
| JP | 2014-210865 | A | 11/2014 |
| JP | 2016-000054 | A | 1/2016 |
| WO | 2012126980 | A1 | 9/2012 |
| WO | 2015058103 | A1 | 4/2015 |
| WO | 2017/202643 | A1 | 11/2017 |

OTHER PUBLICATIONS

Japanese Office Action dated Mar. 12, 2024.

DIN EN ISO 2555:2018-09 (Kunststoffe—Harze im flüssigen Zustand, als Emulsionen oder Dispersionen—Bestimmung der scheinbaren Viskosität mit einem Rotationsviskosimeter mit Einzelzylinder), dated Sep. 2018.

DIN EN ISO 527-3:2003-07 (Kunststoffe—Bestimmung der Zugeigenschaften—Part 3: Prüfbedingungen für Folien und Tafeln), dated Jul. 2003.

Huang, et al: "Lab-on-CMOS: Integrating microfluidics and electrochemical sensor on CMOS", Nano/Micro Engineered and Molecular Systems (NEMS), 2011 IEEE International Conference on, IEEE, pp. 690-693, Feb. 20, 2011.

German Office Action dated Oct. 28, 2022.

* cited by examiner

MICROFLUIDIC ARRAY, METHOD OF MANUFACTURE, MEASURING SYSTEM COMPRISING THE MICROFLUIDIC ARRAY, AND USE

This application is a National Stage application based on an International Application filed under the Patent Cooperation Treaty, PCT/EP2020/056465, filed Mar. 11, 2020, which claims priority to DE 102019112254.6, filed May 10, 2019, and DE 102019135764.0, filed Dec. 23 10, 2019.

BACKGROUND OF THE INVENTION

The present invention relates to a microfluidic array, a method for producing same, a measuring system comprising the microfluidic array, and a use.

In chemical analysis, and also in medical diagnostics, systems are increasingly being developed which replace and expand conventional laboratory analysis by integrating the individual process steps into microfluidic systems.

This development is in particular facilitated by the development of many new production processes, such as e.g. thick-resist processes or LIGA (lithography, electroplating and molding), which opens up new possibilities of combining microfluidic structures.

Microfluidic systems are called lab chips, lab-on-a-chip or µTAS (micro total analysis systems). By making the analysis systems smaller an in-situ application can e.g. be realized, wherein for example carrying out biochemical analyses such as immunoassays, molecular diagnostic assays or cellular analyses or the like in the form of a microfluidic system makes a broad and cost-effective application possible. In particular, the analysis to be carried out in situ directly from whole blood broadens the application of such analyses and provides major advantages for the patient as well as possibilities of reducing costs.

An immunoassay is a method for detecting biologically active substances (antigens/antibodies) often used in medical diagnostics; in molecular diagnostic detection methods, nucleic acids are detected; in cytometric methods, the cells in a sample are characterized.

Known microfluidic systems often comprise chamber systems with pump and/or capillary action, which consist of a substantially two-part laminate.

In a known embodiment, a “rigid”, often injection-molded bottom part has carrier structures which make it possible to examine liquids and the constituents thereof. A top part is arranged on it, which can be e.g. a likewise “rigid” injection-molded top part or alternatively a flexible film. The film or the rigid top part has no structures and substantially functions as a cover. The carrier structures are above all used as spacers, in order that the examination chamber has a precisely defined height, which is necessary for example for the non-overlapping introduction of blood cells into a microfluidic chamber. In the case of the use of a flexible film as top part, possible differences in smoothness of the bottom part can also be evened out due to the flexibility of the film used.

In the methods for producing microfluidic arrays known from the state of the art, although any desired structures with high aspect ratios can be produced by means of injection molding there are also further technical disadvantages in addition to the heavily process-dependent costs.

For example, components with a wall thickness of less than 500 µm can only be produced with great difficulty, which limits the use e.g. of a confocal readout, because an optical thickness of less than 175 µm is a prerequisite here for the use of standard optical systems. Newer optical methods are geared towards an even smaller distance between optical system and sample, in order also to detect phenomena from the optical near field. Wall thicknesses of less than 10 µm are advantageous for this.

Furthermore, the planar removal of an injection-molded part from the injection mold over larger surface areas generates large forces, which are difficult to control, particularly when exacting smoothness of the injection-molded part is to be guaranteed.

Modifications of the injection-molded parts, such as for example additional vapor deposition, printing etc. always have to be carried out on individual parts, which can only be achieved by complex, cost-intensive and slow processes.

Moreover, thin-walled injection-molded parts often do not exhibit the desired dimensional stability, but rather tend towards insufficient flatness, twisting and/or warping.

The object of the present invention is thus to provide an improved method for producing a microfluidic array, which makes a simple and cost-effective provision of a microfluidic system possible.

SUMMARY OF THE INVENTION

The object of the present invention is achieved by the provision of a method according to claim 1 for producing a microfluidic array comprising at least one flow channel, that is completely covered at least in regions, in fluid connection with at least one inlet and at least one outlet, wherein the method comprises the following steps:

a) providing at least one base ply,
b) providing at least one flexible cover ply, which comprises at least one structural element which is arranged on a surface of at least one side of the cover ply, and
c) arranging the at least one flexible cover ply on at least one partial region of the at least one base ply, with the result that at least one partial region of the at least one base ply is arranged on at least one partial region of the at least one structural element arranged on the surface of at least one side of the cover ply to at least partially form at least one flow channel that is completely covered at least in regions.

Preferred embodiments of the method according to the invention are disclosed in the following description.

The object of the present invention is furthermore achieved by the provision of a microfluidic array comprising at least one flow channel, that is completely covered at least in regions, in fluid connection with at least one inlet and at least one outlet, preferably produced by a method according to the present invention, wherein the microfluidic array is characterized in that the microfluidic array comprises at least one base ply and at least one flexible cover ply comprising at least one structural element arranged on a surface of at least one side of the cover ply, wherein at least one partial region of the at least one base ply is arranged on at least one partial region of the at least one structural element arranged on the surface of at least one side of the cover ply to at least partially form the at least one flow channel that is completely covered at least in regions.

Preferred embodiments of the microfluidic array according to the invention are disclosed in the following description.

The object of the present invention is furthermore achieved by the provision of a measuring system comprising at least one microfluidic array according to the present invention and at least one detector.

Preferred embodiments of the measuring system according to the invention are disclosed in the following description.

The object of the present invention is furthermore achieved by the provision of a use of a microfluidic array according to the present invention or of a measuring system according to the present invention in the in-vitro examination of human or animal body fluids, in particular in in-vitro blood analysis.

A microfluidic array according to the invention comprises at least one flow channel, that is completely covered at least in regions, in fluid connection with at least one inlet and at least one outlet, wherein the flow channel preferably has a capillary action on applied and/or introduced liquids.

The flow channel thus preferably has a capillary activity, which can further preferably be used for transporting liquids within the microfluidic array.

The at least one flow channel is in fluid connection with at least one inlet and at least one outlet, wherein a liquid to be examined is preferably applied or introduced into the microfluidic array according to the invention via at least one inlet and wherein air, which is displaced during the transport of the liquid to be examined through the at least one flow channel, can preferably escape via the at least one outlet.

Preferably, the at least one flow channel, further preferably produced by the method according to the invention, of a microfluidic array according to the invention has a height of at most 500 μm, preferably from a range of from 0.1 μm to 500 μm, preferably from a range of from 0.15 pm to 270 μm, preferably from a range of from 0.2 μm to 170 μm, preferably from a range of from 0.5 μm to 100 μm, further preferably from a range of from 0.65 μm to 75 μm, further preferably from a range of from 0.75 μm to 55 μm, further preferably from a range of from 0.85 μm to 35 μm, further preferably from a range of from 0.95 μm to 20 μm, in particular from a range of from 1 μm to 10 μm. Such a flow channel is preferably a capillary-active flow channel.

The inventors have found that it is possible using the method according to the invention to provide a microfluidic array which has a small wall thickness and still has sufficient stability of the provided capillary-active structures of the microfluidic array.

A microfluidic array according to the invention preferably has at least one base ply and at least one cover ply arranged thereon, wherein the at least one base ply further preferably has no structural elements, preferably capillary-active channels and chambers at least in part formed of structural elements.

The structural elements contained in a microfluidic array according to the invention, such as for example capillary-active channels and/or capillary-active chambers and/or spacers and/or inlet elements and/or outlet elements at least in part formed of structural elements, are preferably at least in part arranged in and/or on the at least one cover ply and/or on a surface of the at least one cover ply. In particular, the capillary-active channels and/or capillary-active chambers are preferably only formed by bringing base ply and cover ply together.

The at least one cover ply, which is used for the production of a microfluidic array according to the invention in the method according to the invention, comprises at least one structural element which is arranged on a surface of at least one side of the cover ply.

By the term "at least one structural element" is preferably meant at least one depression and/or at least one raised element which is arranged on a surface of one side of the cover ply, preferably of the cover layer.

A depression can be formed as a channel and/or as a chamber.

A raised element preferably has a, preferably planar, base surface, which is preferably formed oval or angular, arranged on the surface of one side of the cover ply, preferably of the cover layer. A raised element can for example be formed as a convex body or as part thereof. For example, a raised element can be formed, in each case independently of one another, as a spherical segment, pyramid, cone, cylinder, prism, prismatoid, spherical layer, truncated cone, irregularly shaped bodies or combinations thereof.

A raised element preferably has a top surface arranged opposite the base surface, preferably arranged parallel to the base surface, which is congruent or non-congruent with the base surface.

After the at least one flexible cover ply has been arranged on at least one partial region of the at least one base ply, the at least one structural element preferably spaces the at least one flexible cover ply and the at least one base ply apart to form at least one flow channel that is completely covered at least in regions. The spacing between base and cover ply can, in the unfilled state, optionally also only locally, be greater than the height of the structural element.

When the flow channel is filled with at least one liquid and/or dispersion, preferably suspension and/or emulsion, which has in each case at least one liquid phase under standard conditions (for example pressure 1013 mbar, temperature: 25° C.) and/or also at increased temperatures and/or increased or lower pressure (for example pressure between 900 mbar and 1100 mbar, temperature: 50° C.), the at least one flexible cover ply is pulled closer to or pressed against the at least one base ply, preferably by the resulting capillary forces, in particular by suction forces and/or by compressive forces, with the result that the height of the at least one flow channel preferably adapts itself according to the respective height of the at least one structural element. This also provides the advantage that the exact height of the at least one flow channel can preferably be established when the dimensions of the structural elements which are in direct contact with the opposite ply are known.

By liquid and/or dispersion, preferably suspension and/or emulsion, is preferably meant a flowable medium with a dynamic viscosity of less than 1000 mPas, preferably less than 100 mPas, particularly preferably less than 50 mPas. The viscosity data preferably relate to a temperature range between approx. 20° C. and approx. 50° C. The the dynamic viscosity is in each case preferably measured under standard conditions using a rotational viscometer in accordance with the method described in DIN EN ISO 2555:2018-09 (Plastics—Resins in the liquid state or as emulsions or dispersions—Determination of apparent viscosity using a single cylinder type rotational viscometer (ISO 2555:2018); German version of EN ISO 2555:2018—issue date: 2018-9). Here, a defined rotating body rotating in a controlled manner is preferably immersed in the correspondingly temperature-controlled medium to be measured, and the resistance of the medium, in particular at different rotational speeds and/or temperatures, is established.

Such liquids and/or dispersions can be for example human or animal body fluids such as blood, sweat, tears, lymph, saliva, sputum, gastric juice, secretions of the pancreas, bile, urine, semen, amniotic fluid, aqueous fluid, breast milk, synovial fluid, cerebrospinal fluid, bone marrow aspirate, or mixtures thereof.

Such liquids can for example also be dispersions or suspensions or solutions.

The height of the at least one flow channel of a microfluidic array according to the invention of at most 500 μm, preferably from a range of from 0.1 μm to 500 μm, preferably from a range of from 0.15 μm to 270 μm, preferably from a range of from 0.2 μm to 170 μm, preferably from a range of from 0.5 μm to 100 μm, further preferably from a range of from 0.65 μm to 75 μm, further preferably from a range of from 0.75 μm to 55 μm, further preferably from a range of from 0.85 μm to 35 μm, further preferably from a range of from 0.95 μm to 20 μm, in particular from a range of from 1 μm to 10 μm, is preferably at least partially provided by the at least one structural element.

When the chamber is filled, the at least one flexible cover ply is "sucked" onto the at least one base ply by the capillary pressure. In the process, the at least one structural elements comes into direct contact with the base ply. This further preferably leads to an altered brightness of the at least one structural element in transmitted light. Before a direct contact, air or another medium with refractive indices different from the material of the at least one structural element was located between the at least one structural element and the base ply, causing the at least one structural element to appear as a bright area in the form of the cross section of the at least one structural element in transmitted light. On direct contact with the base ply, the at least one structural element preferably appears darker in transmitted light than without this contact because an optically active boundary surface is further preferably now no longer present or only to a negligible extent.

By the term "in transmitted light" is preferably meant when electromagnetic radiation, preferably with a wavelength from a range of from 300 nm to 800 nm, preferably 380 nm to 750 nm, passes through at least partial regions of the microfluidic array, preferably through at least partial regions of the at least one base ply and a cover ply arranged thereon. It is also possible to use UV light (UV=ultraviolet) and IR light (IR=infrared), further preferably in combination with up- and/or downconverters (luminescence, phosphorescence, etc.) or (UV-IR-sensitive) camera systems.

This change in the brightness of the at least one structural element in transmitted light can be used as a reference or as a measuring element of whether the desired spacing between the at least one flexible cover ply and the at least one base ply, which preferably corresponds to the height of the at least one structural element, has been established.

For an advantageous corresponding optical measurement or detection of this change in brightness or this desired spacing, at least one specifically shaped structural element can be provided with which this optical measurement or detection can be performed particularly easily and/or reliably. For example, at least one particular cross-sectional shape and/or at least one particular cross-sectional size is possible. At least one structural element that is finely graduated in terms of height is also possible, with the result that, preferably metrologically, a graduated change in the brightness can be detected optically or metrologically, for example by at least one appropriately arranged sensor. The positions of the structural elements can also be determined, with the result that they can be incorporated into the image evaluation.

The at least one structural element can be produced using methods known from the state of the art, for example by thermal replication, i.e. introducing the structures into a thermoplastic varnish by means of a heated stamping tool, and/or UV replication, i.e. introducing the structures into a liquid or gelatinous varnish accompanied by irradiation with UV radiation while the varnish is in contact with a stamping tool, and/or laser structuring, i.e. ablation of the structures in a plastic, and/or photolithography, i.e. exposure of a photoresist by means of radiation through a mask, subsequent developing and washing of the photoresist, to form the structures, and/or mechanical structuring or machining.

The at least one cover layer, preferably cover ply, preferably has at least one analysis element.

The at least one analysis element preferably has all of the structural elements required for the later use, for example at least parts of a flow channel formed of at least one structural element and/or chamber formed of at least one structural element, which can in each case preferably be in fluid connection with at least one inlet and at least one outlet in the microfluidic array according to the invention.

The at least one cover ply preferably has defined optical and/or mechanical properties at least in the region of the at least one analysis element, for example with respect to the thickness of the at least one cover ply and/or the height of the at least one flow channel and/or its width. The geometric structures present in the at least one analysis element preferably have a defined height and preferably, together with the base ply, form a defined volume, which can be used in the microfluidic array according to the invention for the analysis and/or quantification in particular of constituents of a liquid and/or dispersion to be examined, preferably human or animal body fluid, for example of blood cells in blood.

The at least one analysis element can preferably comprise at least one inlet and/or at least one outlet, which are in each case in fluid connection with the at least one flow channel. Alternatively, the at least one flow channel of the at least one analysis element can also be in fluid connection with the at least one inlet and/or the at least one outlet of the microfluidic array according to the invention via at least one further flow channel.

The fluid connection between the at least one inlet and/or the at least outlet is preferably provided in step c) of the method according to the invention.

For example, the at least one base ply can have at least one inlet and/or at least one outlet, which are in each case brought into fluid connection with the at least one flow channel after the at least one base ply has been arranged on the at least one cover ply.

By arranging the at least one cover ply with the structures of the at least one analysis element on at least one partial region of the at least one base ply, at least one flow channel that is completely covered at least in regions is preferably formed.

The at least one analysis element, preferably the at least one flow channel of the at least one analysis element, preferably has at least one structural element, and optionally, for example, at least one surface texture and/or at least one outer edge.

A structural element of the at least one flow channel can for example be formed in the form of an elevation, for example as a stop edge arranged at the end of the at least one flow channel transverse to the flow direction. A stop edge can for example have a height of from 10 nm to 500 nm, preferably 10 nm to 200 nm, and can result in the liquid not running over the brim of the stop edge. This has the advantage that the liquid cannot escape from the flow channel in an uncontrolled manner, which also provides advantages in the practical handling of the array.

A surface texture can for example be a roughness of at least one surface of the at least one flow channel, in particular a roughness of Ra less than 1 μm, preferably Ra less than 0.1 μm, particularly preferably Ra less than 0.05

μm. This roughness is advantageous in particular when the at least one flow channel has a height of less than 500 μm, preferably less than 20 μm.

For example, in the method according to the invention the width and/or height and/or length of the at least one flow channel of the microfluidic array can be determined by selecting a suitable width and/or height and/or length of the at least one structural element.

The at least one structural element, preferably at least one depression, for example at least one channel and/or the at least one chamber, and/or at least one elevation preferably has a height of at most 500 μm, preferably from a range of from 0.1 μm to 500 μm, preferably from a range of from 0.15 μm to 270 μm, preferably from a range of from 0.2 μm to 170 μm, preferably from a range of from 0.5 μm to 100 μm, further preferably from a range of from 0.65 μm to 75 μm, further preferably from a range of from 0.75 μm to 55 μm, further preferably from a range of from 0.85 μm to 35 μm, further preferably from a range of from 0.95 μm to 20 μm, in particular from a range of from 1 μm to 10 μm.

A raised element can for example be formed as a convex body or part thereof. For example, a raised element can be formed, in each case independently of one another, as a spherical segment, pyramid, cone, cylinder, prism, prismatoid, spherical layer, truncated cone, irregular body or combination thereof.

A raised element preferably has a top surface arranged opposite the base surface, preferably arranged parallel to the base surface, which is congruent or non-congruent with the base surface.

At least one structural element, which is preferably formed in the form of a raised element and further preferably has a preferably planar base surface, which is preferably formed oval or angular, arranged on the surface of one side of the at least one flow channel, can furthermore be arranged inside the at least one flow channel.

Further preferably, the at least one structural element arranged in the flow channel is selected from columns, hemispheres and combinations thereof. In a top view, i.e. in a cross section of the structural element, the at least one column can exhibit the following shapes: round, oval, angular, further preferably three or more corners, with sides of the same or different lengths, stellate etc., as well as irregular shapes.

The lateral surfaces of the at least one structural element can, independently of one another, be flat and/or curved and/or perpendicular and/or inclined and/or a combination thereof.

The at least one structural element can be aligned differently to the flow direction. For example, a structural element can be formed as an elongate column (in top view), preferably aligned in the flow direction of the fluid to be examined through the at least one analysis element. Inside at least one flow channel, several structural elements can furthermore be formed as spacers with different shapes.

A suitable structural element preferably contributes, as spacer, to maintaining the height of the at least one flow channel. Additionally, the formation of currents and/or turbulence inside the at least one flow channel can be controlled, for example promoted or suppressed, through the choice of a suitable structural element.

A suitable structural element can alternatively or additionally be formed as a filter element, for example for filtering particles that are too large. Moreover, structures can also form a filter region, in which e.g. larger cells are separated off before the analysis or cells of different sizes are detected and/or analyzed in different local regions.

A structural element formed as a filter element preferably has, in at least one lateral surface, at least one passage, at least one pore or a combination thereof, which each allow fluid, preferably liquid, and/or particles to pass through the structural element formed filter element.

For example, at least one suitable structural element can likewise be used as a carrier for one or more suitable detection molecules, for example antibodies, which can be arranged on at least partial regions of the surface of the corresponding structural element.

The at least one analysis element therefore preferably has the corresponding at least one geometric structural element.

The corresponding at least one geometric structural element of the analysis element can for example be arranged in at least partial regions of the at least one analysis element before the at least one cover layer is applied to the at least one base layer.

Through the method according to the invention it is therefore easily possible to modify specific partial regions of the at least one analysis element using suitable measures, preferably by applying at least one suitable modifying element, for example in the form of a layer, to at least one partial region of the surface of the at least one analysis element.

As an alternative or in addition to the application of modifying elements to the analysis element, modifying elements can also be or have been applied to the base ply. In particular, it is also possible to apply one or more modifying elements to the analysis element and to apply further modifying elements to the base ply. This is preferred e.g. in the case in which the application of several layers of modifying elements one on top of the other is or could be technically problematic and/or inconvenient, or in the case in which different types of modifying elements are to be kept separate before the flow channel is filled, such that they can only react with each other after one or both modifying elements have been filled and dissolved in the liquid to be examined.

Depending on the design of the at least one modifying element, the physical properties, preferably the optical and/or the electrical and/or the mechanical properties, and/or the chemical properties of the surface of the at least one structural element and/or flow channel can be influenced.

For example, the binding capacity of at least partial regions of the surface of the at least one channel can be influenced through the choice of suitable modifying elements, for example by applying suitable antibodies, antigens and/or in each case biologically active fragments thereof.

It is also possible, for example, to modify the hydrophobic and/or hydrophilic property by applying suitable molecules, for example hydrophobing agents.

The modifying elements can be applied by at least partial vapor deposition and/or sputtering and/or spraying and/or printing methods and/or dipping methods. Here, both inorganic materials or organic materials or combinations thereof can be applied in one or more layers, wherein the individual layers can have different or also identical materials from or to each other. Local spraying can be effected e.g. by previously covering with a mask layer. For this, a mask with openings is accurately applied to parts of the analysis element and then the uncovered parts are modified by spraying with modifying elements, in particular a reagent.

The cross section of the at least one flow channel can for example furthermore be narrowed and/or widened in order for example to control the flow rate of a liquid to be analyzed.

Suitable modifying elements can for example be arranged in the at least one cover layer as additive. Suitable additives can preferably escape from the at least one cover layer, for example by diffusion and/or migration.

The at least one flexible cover ply, preferably cover layer, and/or the at least one base ply, preferably base layer, preferably comprises at least one additive, which is preferably selected from the group which consists of dyes and/or reagents, which react with further components to form dyes or react with other dyes already present such that the chromaticity is reduced, contrast agents, stabilizers, light stabilizers, antioxidants, biological adjuvants, surfactants, and mixtures thereof. By dyes is meant in particular those substances which develop an optically perceptible action in the range of UV radiation, visible light and IR radiation.

If several additives are used in a microfluidic array, they can be applied in several layers one on top of the other and overlapping and/or adjacent next to each other and/or also as single-layered or multilayered mixtures. The surface regions with additives applied next to each other can be combined in particular with in each case differently shaped structural elements, which provide different volumes in particular for the different additives. For example, differently shaped depressions into which the additives are then introduced can be arranged for different additives. Depending on the type of the additive, the volumes of the depressions can then be of different sizes.

Further preferably, the at least one additive is arranged soluble in and/or on the cover ply, preferably cover layer, preferably in or on at least partial regions of at least one surface of the at least one structural element and/or cover layer.

Further preferably, the at least one additive is arranged soluble in and/or on at least partial regions of at least one surface of the base ply, preferably base layer. For example, the at least one additive can be arranged soluble in and/or on at least partial regions of at least one surface of the base ply, preferably base layer, and at least one further additive can be arranged soluble in and/or on at least partial regions of a surface of a second cover ply, preferably second cover layer, and/or preferably in and/or on at least partial regions of a surface of a second base ply, preferably second base layer.

If several, preferably different, additives which can react with each other during storage and/or which diffuse out during inflow and/or dissolve and/or behave differently are to be arranged in the microfluidic array, it may be preferred to apply at least one of the additives to the base ply via a printing process and to introduce at least one further additive into the flexible ply, preferably into the cover ply, further preferably into the cover layer, via the previously described processes.

If flow cells and or cuvettes which are not filled by capillary action, but rather are filled by and exposed to pressure, are to be produced with the previously described processes, it may be advantageous to mount a flexible ply on a base ply on the side facing away from the structural layer and/or the cover layer and to join, in particular glue and/or bond, or press it, by means of a holder, against a second stiff ply.

If on the other hand several additives are to be introduced into a flow cell and or cuvette which is filled by or exposed to pressure, it may be advantageous to apply a first flexible ply to a first base ply on the side facing away from the structural layer and/or the cover layer and to apply a second flexible ply to a second base ply on the side facing away from the structural layer and/or the cover layer and subsequently to join, in particular glue and/or bond, or press, by means of a holder, the two laminates formed, with the structure sides, together.

Further preferably, the at least one additive is microencapsulated in particles which arranged in and/or on the cover ply, preferably cover layer, preferably in or on at least partial regions of at least one surface of the at least one structural element and/or cover layer.

If the at least one additive is arranged in the cover ply, the at least one additive can be introduced in particular by an extrusion procedure. Additives with otherwise low solubility can also be introduced into the cover ply by means of extrusion.

The at least one additive can be arranged in at least one chamber, which is preferably in fluid connection with the at least one channel, and/or in at least one varnish layer, wherein the at least one varnish layer is preferably arranged on at least partial regions of at least one surface of the at least one channel.

The at least one additive can be arranged in at least one depression, which is preferably in fluid connection with the at least one channel, and/or in at least one varnish layer, wherein the at least one varnish layer is preferably arranged on at least partial regions of at least one surface of the at least one channel.

Above-named additives are preferably at least partially released into the liquid to be examined, for example in order to modify, for example to stain, particles, for example cells, contained in the liquid, and/or in order to make a specific detection reaction possible.

Above-named modifying elements, for example layers, preferably remain bound on the applied surface.

Above-named additives can preferably diffuse into the fluid, preferably liquid, to be examined.

Through modification, in particular by covering the modifying elements, in particular partial regions of the modifying elements with suitable materials, the rate of solution and/or the rate of diffusion can be controlled for the delayed release of modifying elements, in particular reagents, into the liquid to be examined. These can be one or more modifying agents, in particular reagents, the rate of solution and/or rate of diffusion of which is preferably identical or different and/or is delayed to a different extent.

The geometric design of the at least one structural element and thus of the flow channel formed can preferably be influenced, for example through the choice of suitable slopes.

At least one structural element preferably comprises in each case at least one base surface and in each case at least one first lateral surface directly connected to the base surface, wherein the angle between the at least one base surface and the at least one first lateral surface is from 30° to 90°, preferably from 45° to 90°, particularly preferably from 70° to 90°.

For example, the at least one flow channel can be formed as at least one chamber at least in regions.

A chamber preferably has a defined volume, which is suitable for storing a defined quantity of liquid over a defined period of time. Through the defined volume of the chamber, the volume of the quantity of liquid located therein is thus also relatively accurately known when the chamber is as far as possible completely filled. For example, a chamber can be formed as a storage container for reagents, for example above-named additives.

In the case of a partial filling of the chamber in the flow direction, the quantity of liquid in the chamber can be determined by determining the filled region, e.g. through an image acquisition with subsequent evaluation.

Preferably, the at least one analysis element can furthermore comprise at least one functional element, which is arranged at least in fluid communication with the at least one channel and is preferably selected from the group which consists of microfluidic separators, microfluidic mixers, microfluidic pumps, microfluidic valves, and combinations thereof.

Preferably, the at least one analysis element can furthermore comprise at least one optical element, preferably from the group of optical lenses, preferably microlenses, diffractive elements, Moiré elements, registration marks and combinations of the above-named elements.

The flow channel can have one or more chambers, wherein in particular one pre-chamber and one main chamber are provided, in which the pre-chamber can serve as a mixing chamber, in which for example modifying elements can be mixed.

Furthermore, at least one pre-chamber and/or at least one after-chamber, which are preferably in fluid communication with the at least one main chamber, can be arranged in the at least one analysis element.

Through above-named functional elements, a control of the movement, mixing, separation and/or other process steps inside the at least one flow channel of the microfluidic array can preferably also be effected.

At least one liquid can preferably be moved, mixed, separated and/or otherwise processed in at least one flow channel, further preferably produced by the method according to the invention.

Liquids and/or dispersions, preferably suspensions and/or emulsions, which have in each case at least one liquid phase under standard conditions (for example pressure 1013 mbar, temperature: 25° C.) and/or also at increased temperatures and/or increased or lower pressure (for example pressure between 900 mbar and 1100 mbar, temperature: 50° C.), can preferably be moved, mixed, separated and/or otherwise processed in at least one flow channel, further preferably produced by the method according to the invention.

Suitable suspensions are, for example, biological liquids, which can contain cells of very varied origins. The cells contained in a biological liquid are, for example, not only limited to endogenous cells, such as erythrocytes, leukocytes or thrombocytes, but also comprise exogenous cells, for example pathogens such as bacteria, viruses, algae, parasites, fungi, or protozoa.

At least one liquid and/or dispersion, preferably suspension and/or emulsion, which has at least one liquid phase under standard conditions (pressure 1013 mbar, temperature: 25° C.), can preferably be contacted with at least one additive, which for example allows a specific detection, for example of a specific pathogen, in at least one flow channel, further preferably produced by the method according to the invention, and then analyzed and/or quantified preferably using an optical evaluation method, preferably in a measuring system according to the invention. The functional element can preferably contain a liquid-absorbing material, e.g. cellulose fibers, in order e.g. to prevent the unintentional leakage of liquids.

A quantification can for example be effected by counting a particle count, e.g. cell count, and/or by comparing a coloring with a calibration curve obtained from a serial dilution according to methods known to a person skilled in the art. The coloring can be ascertained in each case locally or determined integrally over the entire sample. An internal standard can thereby also be applied virtually without additional costs.

A measuring system according to the invention comprising at least one microfluidic array and at least one detector, for example at least one extensive radiation detector, such as for example a photocell, an imaging chip or a photomultiplier.

Additionally, the measuring system can also have optical microscopes or magnifiers, in order e.g. for operating personnel to be able to monitor the filling of the cells and/or in order also to make particular evaluations by operating personnel possible.

A measuring system according to the invention preferably furthermore comprises at least one radiation source. By a radiation source is meant an emission source, which generates electromagnetic radiation at one or more discrete wavelengths or across a particular spectrum with a particular, optionally wavelength-dependent intensity. The following ranges of electromagnetic radiation are included: UV, visual range, IR. Several identical or different radiation sources are also preferably used.

The at least one microfluidic array can be arranged in a measuring system according to the invention for single and or multiple use.

Different analyses are preferably carried out by one measuring system. For example, one measuring system can be used to determine the number of cells and/or shape thereof in a sample, or to carry out a quantitative fluorescence measurement and/or for the characterization of cells, for example for the differentiation of various cell types, the cell cycle thereof and any degeneration.

In a preferred embodiment, the at least one flexible cover ply has a maximum thickness of at most 250 μm, preferably of at most 100 μm.

Further preferably, the at least one flexible cover ply comprises at least one polymer, which is preferably selected from the group which consists of thermoplastics, thermosets and thermoplastic elastomers (TPE), preferably of PET, PMMA, ABS, PEN, BOPP, PVC, PA, particularly preferably of PET or PEN and mixtures thereof.

By selecting suitable constituents of the flexible cover ply and their thickness, the optical properties of the cover ply can in particular be tailored to an intended use, in that for example the optical properties, such as transparency and/or absorption of the cover ply, can for example be adapted to the analysis system to be used.

The at least one flexible cover ply, at least in regions, preferably in a region comprising the at least one analysis element, is preferably transparent to electromagnetic radiation, preferably with a wavelength of the electromagnetic radiation of at least 200 nm, further preferably in a wavelength range of the electromagnetic radiation of from 200 nm to 1000 nm. This range comprises in particular the range of ultraviolet radiation (approx. 200 nm to approx. 400 nm wavelength), the range of radiation visible to the human eye (approx. 400 nm to approx. 800 nm wavelength) and the infrared range (from approx. 800 nm wavelength).

The at least one flexible cover ply preferably has a modulus of elasticity in tension of from 100 MPa to 4000 MPa, preferably 1500 MPa to 3000 MPa, in each case determined in accordance with DIN EN ISO 527-3:2003-07 ("Plastics—Determination of tensile properties—Part 3: Test conditions for films and sheets—issue date: 2003-07), preferably at room temperature (25° C.). The modulus of elasticity in tension is ascertained here on film test strips by means of a tensile testing machine (for example a tensile testing machine from ZwickRoell GmbH & Co. KG, Ulm, DE). The width of the film strips is preferably 15 mm+/−0.1 mm, the length of the film strips is preferably 100 mm+/−0.5 mm or 50 mm+/−0.5 mm for film materials with high elongation. The test speed for a film length of 100 mm is 10 mm/min+/−1 mm/min or the test speed for a film length of 50 mm is 5 mm/min+/−1 mm/min.

The at least one flexible cover ply preferably has stable structures on a microscopic scale and can at the same time represent a very thin layer on a macroscopic scale, which make a wall thickness of the analysis element that is small on a macroscopic scale as well as an easy production of the structural elements via known methods, for example roll-to-roll replication, possible.

For example, a thermoplastic film, for example PET film, can have, as carrier ply, a coating of a preferably radiation-curing varnish printed on and/or poured on and/or applied with a doctor blade and/or sprayed on. At least one structural element, which further preferably have in any direction a spacing of from approx. 10 μm to 200 μm, preferably 15 μm to 90 μm, from the next structural element in each case, is arranged on or in a surface of this varnish layer, preferably side of the varnish layer facing away from the surface of the carrier ply. The spacings in different directions can also be different. For example, the spacings can be made larger transverse to the flow direction and smaller in the flow direction. The spacings can also vary locally. For example, the spacings in one direction can become increasingly larger, linearly or non-linearly. The spacings can also simultaneously vary correspondingly in two directions or the spacings can also form a pattern or a motif. It is preferably sufficient if the minimum spacing between two or more arranged structural elements corresponds to approx. twice to four times the thickness of the in particular multilayered flexible cover ply.

The structural elements can be introduced, in particular replicated, directly into the carrier material of the flexible cover ply. The ordered position thereof in particular also allows partial volumes to be determined and makes it easier to quickly locate the functional focal plane. In addition, irregularities in the imaging of this ordered position of the structural elements can be used for error correction.

In a preferred embodiment, the at least one flexible cover ply comprises on a carrier ply a cover layer made of at least one replication varnish, wherein the structures of the at least one analysis element is arranged on a surface of at least one side of the cover layer.

Here, the flexibility of the carrier ply and the cover layer can differ from each other or also be similar. For example, the carrier ply and also the cover layer can be composed of thermoplastic polymers, which have similar mechanical properties, in particular similar moduli of elasticity. Alternatively, the carrier ply can be composed of thermoplastic polymers and the cover layer, by contrast, can be composed of crosslinking and thermosetting, in particular radiation-curing polymers, wherein the carrier ply and the cover layer in each case have different mechanical properties, in particular different moduli of elasticity. In particular, the thermoplastic cover layer can have a modulus of elasticity of, for example, 2000 MPa and the crosslinked cover layer can have a modulus of elasticity of, for example, 9000 MPa. The cover layer here can have a thickness of less than 30 μm, preferably of less than 10 μm and particularly preferably of less than 5 μm.

The structures of the at least one analysis element can for example be formed in the form of a positive structure or negative structure. In particular, a positive structure can be formed by structures that are predominantly convex or raised relative to the surrounding surface, a negative structure, by contrast, can be formed in particular by structures that are predominantly concave or recessed relative to the surrounding surface.

Further preferably, the at least one replication varnish comprises at least one polymer, which is preferably selected from the group which consists of thermoplastics, thermosets, thermoplastic elastomers (TPE), preferably consists of PET, PMMA, ABS, PEN, BOPP, PVC, PA, particularly preferably of PET or PEN and mixtures thereof.

Preferably, the at least one flexible cover ply furthermore has at least one decorative element, wherein the at least one decorative element influences the surface texture, and/or the color of the surface, of the at least one flexible cover ply, preferably cover layer, wherein the at least one decorative element is preferably formed as a motif, as a decoration, for example single-image decoration or endless decoration, as a pattern, or a combination thereof.

Further preferably, the at least one decorative element is formed, at least in regions, as a decorative layer, which is preferably selected from the group which consists of transparent and/or colored varnish layers, in particular comprising one or more dyes and/or pigments, replication layers with a molded optically and/or functionally active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers and combinations thereof.

Further preferably, the at least one flexible cover ply and/or the at least one decorative element has further replication layers, coatings, light-coupling elements, colorings, register marks, inscriptions, position marks, reference marks, microscope adjustment aids/focusing aids, identification markings (numbers, barcodes), quality marks, microlenses and/or partial metal layers.

By register or registration, or register accuracy or registration accuracy, is preferably meant a positional accuracy of two or more elements and/or layers and/or plies, here in particular of a donor film and/or a film element, for example cover ply, relative to the receiver film, for example base ply.

The register accuracy is to range within a predefined tolerance which is to be as low as possible. At the same time, the register accuracy of several elements, partial regions, in particular one or more film elements, films, plies and/or layers relative to each other is an important feature in order to increase the process reliability.

The positionally accurate positioning is effected in particular by means of markings, in particular by means of sensorially, preferably optically detectable registration marks or register marks. These markings, in particular registration marks or register marks, preferably either represent specific separate elements or regions or layers or are preferably themselves part of the elements or regions or layers to be positioned.

The at least one flexible cover ply can be locally thickened, for example provided with reinforcing ribs or the like, or thinned. Further decorative or functional layers or elements can additionally be arranged on the structure side or on the side facing away from the structure. Such arrangements can result in a fast directed formation of the suction effect and thus of the filling speed.

Further preferably, at least one adhesive ply, which preferably comprises at least thermoplastic components, crosslinking components or combinations thereof, is arranged on the side of the cover ply, preferably cover layer, having the at least one channel.

Typical thermoplastic adhesive components are, for example, polyethylene; polyvinyl acetate and copolymers thereof; acrylic resins and copolymers thereof; methacrylic resins and copolymers thereof, polyvinyl butyral, polyamides, polyesters, chloroprene resins, polypropylenes, polyvinyl alcohol, polycarbonates, polyurethanes.

Typical crosslinking adhesive components are, for example, melamine resins, phenolic resins; polyurethane resins, UV-crosslinking resins, cationically crosslinking resins, electron-beam crosslinking resins.

Thermoplastic components and crosslinking components can also be combined in an adhesive ply. It is also possible to arrange thermoplastic adhesive plies and crosslinking adhesive ply adjacent to each other in surface regions. It is also possible to arrange thermoplastic adhesive plies and crosslinking adhesive ply adjacent to each other in multiple layers one on top of the other.

Plasticizers and/or wetting agents can additionally be added to the adhesive ply.

The adhesive ply can be arranged on the cover ply as a planar adhesive layer or as an adhesive partial region.

By arranging the adhesive ply on the side of the cover ply, preferably cover layer, having the at least one analysis element, the adhesion of the base ply to the cover ply is preferably improved. The adhesive ply, as an adhesive partial region, can additionally form side edges or side walls of the flow channel at least in sections.

The at least one cover ply, preferably cover layer, can preferably have additional structures inside which at least one adhesive can be applied or which are covered after application of adhesive and application of the base ply to the cover ply and are not optically perceptible or perceptible only to a reduced extent.

A microfluidic array according to the invention comprises at least one, preferably stiff, base layer, which further preferably reveals a thickness of at least 200 μm, preferably of at least 600 μm.

The at least one, preferably stiff, base ply is preferably composed of at least one polymer, at least one glass, at least one metal, at least one semiconductor material or a combination thereof.

The at least one, preferably stiff, base ply preferably has a modulus of elasticity of greater than 1000 MPa, preferably greater than 2000 MPa, particularly preferably greater than 2500 MPa, in each case determined according to DIN EN ISO 527-3 (issue date: 2003-07), preferably determined at room temperature (25° C.).

The at least one, preferably stiff, base ply is preferably, at least in regions, transparent to electromagnetic radiation, preferably with a wavelength of the electromagnetic radiation of at least 200 nm. This range comprises in particular the range of ultraviolet radiation (approx. 200 nm to approx. 400 nm wavelength), the range of radiation visible to the human eye (approx. 400 nm to approx. 800 nm wavelength) and the infrared range (from approx. 800 nm wavelength). Further preferably, at least one, preferably stiff, base ply is, at least in regions, transparent to electromagnetic radiation, preferably with a wavelength of the electromagnetic radiation of from at least 200 nm to 1000 nm.

For example, an optical evaluation of a liquid to be examined in a microfluidic array according to the invention can thereby be effected, for example, by irradiation of electromagnetic radiation through the base ply.

The at least one, preferably stiff, base ply can furthermore comprise or consist of, for example, a CCD sensor or a CMOS sensor.

As an alternative to the base ply comprising or consisting of a CCD sensor or a CMOS sensor, it is possible for such a CCD sensor or CMOS sensor to be arranged as a separate element, in particular as constituents of a measuring device or analytical apparatus, preferably immediately adjacent to the base ply. This separate sensor can lie directly against the base ply, or optically active structures, for example microlenses or other micro-optical arrays, are also provided between base ply and sensor, in order to optically adapt the sensor to the microfluidic array and thus to make it possible to image the constituents in the sample, for example cells, on the sensor. The microlenses or other micro-optical arrays can be a constituent of the base ply or be provided as a separate ply.

Further preferably, the at least one, preferably stiff, base ply has macroscopic structures, with a minimum structure size of greater than 10 μm, preferably at least one or more of the following functional elements: inlet, outlet, through-hole, depression, bulge, wall element, channel element, pre-chamber, mixing chamber, collection chamber, analysis chamber or combinations thereof. A collection chamber is preferably arranged after an analysis chamber in the flow direction.

The functional elements can be "empty", partially filled or completely filled. For example, a collection chamber can be filled to 50% with an absorbent agent, in order to prevent liquids which enter the collection chamber from running out in an uncontrolled manner. Examples of fillings are cellulose fibers, which absorb liquids, activated carbon for the absorption of liquids and/or solids etc.

It is also possible for an inlet or outlet chamber also to be fitted with filtration elements, with the result that, in the case of the inlet chamber, particular portions of the liquid to be examined are separated off.

The at least one, preferably stiff, base ply can furthermore have at least one decorative element, wherein the at least one decorative element influences the surface texture, and/or the color of the surface, of the at least one, preferably stiff, base ply, wherein the at least one decorative element is preferably formed as a motif, as a decoration, for example single-image decoration or endless decoration, as a pattern, or a combination thereof.

Preferably, the at least one decorative element is formed, at least in regions, as a decorative layer, which is preferably selected from the group which consists of transparent and/or colored varnish layers, in particular comprising one or more dyes and/or pigments, replication layers with a molded optically active surface structure, reflective layers, in particular opaque reflective layers, transparent reflective layers, metallic reflective layers or dielectric reflective layers, optically variable layers, optically active layers, interference multilayer systems, volume hologram layers, liquid crystal layers, in particular cholesteric liquid crystal layers, electrically conductive layers, antenna layers, electrode layers, magnetic layers, magnetic storage layers and combinations thereof.

Further preferably, the at least one, preferably stiff, base ply has further coatings, light-coupling elements, colorings, register marks, inscriptions, position marks, microscope adjustment aids/focusing aids, identification markings (numbers, barcodes), quality marks, title blocks, logos and/or partial metal layers.

In a preferred embodiment, the at least one cover ply is provided in the form of a transfer film, wherein the transfer film furthermore has at least one carrier ply, which is arranged detachably on the side of the at least one cover ply lying opposite the at least one analysis element.

The at least one carrier ply preferably comprises at least one carrier layer made of a polyester, a polyolefin or a combination thereof, in particular of PET, which preferably has a layer thickness of between 4 μm and 150 μm, preferably between 10 μm and 50 μm.

The at least one carrier ply preferably furthermore comprises at least one detachment layer, which is arranged on the side of the carrier ply facing the cover ply.

The at least one detachment layer preferably comprises at least one wax, preferably montan ester wax, at least one silicone, at least one polyurethane or acrylate or a combination thereof, preferably in a layer thickness of from 0.1 nm to 100 nm.

Alternatively, the at least one cover ply can be provided in the form of a laminating film, wherein the laminating film furthermore has at least one carrier ply, which is arranged, preferably non-detachably, on the side of the at least one cover ply lying opposite the at least one channel.

The laminating film preferably furthermore comprises at least one adhesive layer, which is arranged on the side of the carrier ply facing the cover ply. The carrier film can be removed from the cover ply after the latter has been applied.

A protective ply, which is preferably removed from the cover ply before the the at least one cover ply is arranged on the base ply, is preferably furthermore arranged detachably on the side of the cover ply containing the at least one analysis element.

Further preferably, in step c) the at least one, preferably stiff, base ply is arranged undetachably on the cover layer.

The at least one cover ply used in the method according to the invention can be provided, for example, in the form of at least one transfer film, which has at least one transfer ply arranged detachably on a carrier ply. On the at least one cover ply, the surface of the at least one cover ply having the at least one structural element is in particular arranged on the side of the at least one transfer ply lying opposite the carrier ply.

A transfer film used in the method according to the invention is used to transfer at least one transfer ply onto the at least one base ply, wherein the side of the at least one transfer ply lying opposite the carrier ply is at least partially arranged, preferably non-detachably, on at least one surface of at least one side of the base ply.

With the transfer ply, the at least one cover ply and the at least one analysis element are transferred onto the at least one base ply.

In particular, the at least one structural element, which is arranged at least on a surface of the side of the at least one transfer ply lying opposite the carrier ply, is arranged, preferably non-detachably, on the at least one surface of the at least one side of the base ply, to obtain at least one flow channel that is completely covered at least in regions.

After the transfer ply has been arranged on at least partial regions of the at least one surface of at least one side of the base ply, the carrier ply is removed from the transfer ply, preferably completely, with the result that only the transfer ply remains on at least partial regions of at least one surface of at least one side of the base ply, to obtain a microfluidic array according to the invention.

It can be provided that the at least one carrier ply comprises at least one carrier layer, preferably carrier film, made of a polyester, a polyolefin or a combination thereof, in particular of PET, which preferably has a layer thickness of between 4 μm and 100 μm, preferably between 10 μm and 50 μm.

It can be provided that the at least one carrier ply furthermore comprises at least one detachment layer, which is arranged on the side of the carrier ply facing the cover ply. The at least one detachment layer preferably comprises at least one wax, preferably montan ester wax, at least one silicone, at least one polyurethane, at least one acrylate or a combination thereof, preferably in a layer thickness of from 0.1 nm to 100 nm.

The detachment layer preferably remains on the carrier ply, preferably carrier film, after the detachment.

It can be provided that the transfer film has a second carrier ply, preferably carrier film, on its transfer ply, in particular side of the transfer ply facing the surface of the cover ply having the at least one structural element.

The second carrier ply, preferably carrier film, can be formed as a protective layer for the surface of the cover ply having the at least one structural element.

The second transfer film can preferably have a master relief structure on its side facing the transfer ply, wherein the surface of the cover ply having the at least one structural element preferably has a relief structure that is complementary to the master relief structure of the second carrier film.

The master relief structure is preferably introduced into the second carrier ply, preferably carrier film, and/or applied to the second carrier ply, preferably carrier film, preferably by method steps and devices tried and tested in practice and suitable for mass production, for example by a roll-to-roll process.

The master relief structure can preferably be formed by a stamping in the second carrier ply, preferably carrier film. Stamping methods can be provided, which are used in the production of film bodies. If the second carrier ply, preferably carrier film, is a thermoplastic carrier ply, preferably carrier film, the master relief structure can be introduced using a thermal stamping method by a stamping roller under pressure and temperature. A second carrier ply, preferably carrier film, stamped in such a way is sufficiently stable to rule out the deformation of the structural layer during the hot stamping of the second relief structure.

However, it can also be provided that the second carrier ply, preferably carrier film, has a layer into which the master relief structure is molded. It can be provided, for example, to apply a thermoplastic replication varnish layer to the second carrier ply, preferably carrier film, to dry the varnish layer and then to mold the master relief structure into this varnish layer.

It can further be provided to apply a UV-curable replication varnish to the second carrier ply, preferably carrier film, and to introduce the master relief structure during the application using a stamping roller. The UV source required to cure the UV varnish can either be arranged in the transparent stamping roller or under the second carrier ply, preferably carrier film. In a modified embodiment it can be provided to mold the master relief structure by partial irradiation of the UV-curable replication varnish layer of the second carrier ply, preferably carrier film, and to remove the uncured regions subsequently by washing.

To form the at least one structural element, it can be provided to apply the at least one flexible cover ply to the second carrier ply, preferably carrier film, in the form of a replication varnish, for example a thermoplastic replication varnish and/or UV-curable replication varnish, and to mold the at least one structural element, preferably using at least one stamping roller.

The use of a UV-curable replication varnish is advantageous, because the UV-curable varnish can be formed particularly flowable and is thus able to completely fill the smallest cavities of the master relief structure.

It is advantageous that UV-curable varnish forms a particularly temperature-stable layer. It can therefore also be provided to form the at least one structural element from two layers, wherein advantageously the first layer can be formed of UV-curable varnish and the second layer can be formed of thermoplastic varnish. Both layers should advantageously be formed with the same optical refractive index, with the result that the layer structure is not optically perceptible.

In a further advantageous design, it can be provided that the second carrier ply, preferably carrier film, has a partial printing. The partial printing can be particularly advantageous in order to form master relief structures with a low depth-to-width ratio particularly easily.

The thickness of the printed layer can be set differently, for example between 2 μm and 5 μm. The partial printing can also be provided to supplement the above-described stamping of the master relief structure, for example in order to individualize the master relief structure.

The second carrier ply preferably comprises at least one carrier layer, preferably carrier film, made of a polyester, a polyolefin or a combination thereof, in particular of PET, which preferably has a layer thickness of between 4 μm and 150 μm, preferably between 10 μm and 50 μm.

It can be provided that the second carrier ply furthermore comprises at least one detachment layer, which is arranged on the side of the second carrier ply facing the cover ply. The at least one detachment layer preferably comprises at least one wax, preferably montan ester wax, at least one silicone, at least one polyurethane, at least one acrylate or a combination thereof, preferably in a layer thickness of from 0.1 nm to 100 nm.

In a preferred embodiment, a transfer film used in the method according to the invention has one or more transfer plies separated from each other and arranged next to each other, which each comprise a cover ply or cover ply regions separated from each other and arranged next to each other, wherein in each case a cover ply, in particular the surface of the cover ply having the at least one structural element, is arranged on the side of each transfer ply lying opposite the first carrier ply.

The transfer film is preferably provided as a continuous, multi-ply base film, wherein preferably along at least one boundary line, which defines at least one first partial region and separates the at least one first partial region from a second partial region, severed.

Further preferably, the transfer film comprises a second carrier ply, which is arranged on the side of the first carrier ply lying opposite the transfer ply.

Further preferably, the transfer film has a second carrier ply and a first adhesive layer applied to the surface of the first carrier ply facing away from the transfer ply, wherein the first adhesive layer is arranged between the first carrier ply and the second carrier ply and the first adhesive layer is activated in a first region at least partially covering at least one first partial region of the base film, with the result that the base film adheres to the second carrier film in the at least one first partial region, and is, however, not activated, not provided, only partially provided or deactivated in a second part adjoining the at least one first partial region, and wherein the first carrier film is severed along the boundary lines defining the at least one first partial region and separating the at least one first partial region from a second partial region of the base film and a part of the base film comprising the second partial region is removed from the second carrier film. This design is in particular advantageous, because both optical and other defects of the first and/or second carrier film (e.g. background fluorescence) do not affect the functionality of the microfluidic array.

The base film preferably has a detachment layer arranged between the first carrier ply and the transfer ply. Further, it is also possible for the material and the surface nature of the first carrier ply, preferably carrier film, and of the layer of the transfer ply facing the first carrier ply, preferably carrier film, to be chosen such that the transfer ply can be detached from the first carrier ply, preferably carrier film.

Further preferably, there is no detachment layer between the first carrier ply, preferably carrier film, and the transfer ply. According to this embodiment, the first adhesive layer and a second adhesive layer arranged between the transfer ply and the target substrate are chosen such that the adhesive strength produced by the activated first adhesive layer between the first carrier ply, preferably carrier film, and the second carrier ply, preferably carrier film, is lower than the adhesive strength produced between the transfer ply and the target substrate by the activated second adhesive layer. It is hereby possible after the second adhesive layer has been activated to remove the second carrier ply, preferably carrier film, from the first partial region of the base film and thus to apply the entire first partial region of the base film, i.e. transfer ply and first carrier ply, preferably carrier layer, to the target substrate by means of a transfer process.

It has proved worthwhile for the first adhesive layer to be applied to the first carrier ply, preferably carrier film, and then for the second carrier ply, preferably carrier film, to be applied to the first adhesive layer. However, it is also possible for the first adhesive layer to be applied to the second carrier ply, preferably carrier film, and then for the film body comprising the second carrier ply, preferably carrier film, and the first adhesive layer to be applied to the first carrier ply, preferably carrier film, and thus for the first adhesive layer to be applied to the first carrier ply, preferably carrier film, with the aid of the second carrier ply, preferably carrier film.

An adhesive layer that can be activated by electromagnetic radiation, in particular an adhesive layer consisting of a UV-activatable adhesive which can be activated by irradiation with UV light, is preferably used as first adhesive layer. On the one hand the advantage is hereby achieved that the activation of the first adhesive layer in the first region can be controlled with pinpoint accuracy. It has further been shown that using such an adhesive layer can reliably prevent the first carrier ply, preferably carrier film, from detaching from the second carrier ply, preferably carrier film, during a subsequent transfer process and thus also further improve the transfer result.

The first adhesive layer is preferably applied over the whole surface of the carrier ply, preferably carrier film, facing away from the transfer ply both in the at least one first partial region and also in the second partial region. The activation of the first adhesive layer in the first region is here effected subsequently before the second part of the base film is removed. The first adhesive layer can be applied here for example by means of a printing process, for example gravure printing or screen printing, but also by means of pouring, spraying or coating using a doctor blade onto the first carrier ply, preferably carrier film.

The first adhesive layer is preferably activated by irradiation in the first region after the second carrier ply, preferably carrier film, has been applied, with the result that the second carrier ply, preferably carrier film, adheres to the first carrier ply, preferably carrier film, in the first region. The material of the first adhesive layer is here further preferably chosen in relation to the first carrier ply, preferably carrier film, and the second carrier ply, preferably carrier film, such that the adhesion between first carrier ply, preferably carrier film, and second carrier ply, preferably carrier film, after activation of the first adhesive layer is higher than the adhesion imparted by the detachment layer between transfer ply and first carrier ply, preferably carrier film, even at room temperature (20° C.). Further, the material of the first adhesive layer is preferably chosen in relation to the first carrier ply, preferably carrier film, and the second carrier ply, preferably carrier film, such that the adhesion between the first carrier ply, preferably carrier film, and the second carrier ply, preferably carrier film, in the case of a non-activated first adhesive layer, is lower than the adhesion imparted by the detachment layer between first carrier ply, preferably carrier film, and transfer ply, both at room temperature (20° C.) and at the stamping temperature (180° C.).

It has further proved to be advantageous that the adhesion properties between the first adhesive layer and first and/or second carrier ply, preferably carrier film, are adapted by applying primers, adhesion promoters or by corona, flame or plasma treatment of the first or second carrier ply, preferably carrier film.

According to a preferred embodiment example of the invention, the first adhesive layer is irradiated by a radiation source arranged spaced apart in the direction of the side of the second carrier ply, preferably carrier film, facing away from the transfer ply. The radiation source is here preferably arranged spaced apart more than 0.10 mm from the second carrier ply, preferably carrier film. A UV radiation source which exposes the first adhesive layer to collimated light, preferably to UV light, is preferably used as radiation source. For example, UV lamps with a downstream collimator or also a laser are thus suitable as radiation source.

Through such an exposure of the first adhesive layer it is possible to choose the exposure of the first adhesive layer independently of the design of the transfer ply of the base film. The second carrier ply, preferably carrier film, here preferably consists of a material which is substantially transparent to the wavelength range of the radiation source used for the exposure.

A selective exposure of the first adhesive layer in the desired regions, for example the selective irradiation of the first adhesive layer in the first region to activate the first adhesive layer in the first region, can be achieved by a corresponding actuation of the radiation source or by arranging an exposure mask in the beam path between the radiation source and the first adhesive layer.

Further, it is also possible to deactivate the first adhesive layer by exposure in the second region. For example, it is thus possible to use a corresponding adhesive for the first adhesive layer, which can be deactivated for example by means of UV radiation. Further, it is also possible to use a UV-activatable adhesive for the first adhesive layer, which cures when irradiated with UV light, and to irradiate the first adhesive layer before the second carrier ply, preferably carrier film, is applied in the second region. The first adhesive layer is thus cured before the second carrier ply, preferably carrier film, is applied in the second region, with the result that an adhesion of the second carrier ply, preferably carrier film, in the second region no longer possible after the second carrier ply, preferably carrier film, has been applied as the first adhesive layer has already been cured and thus deactivated in this region.

A laser, which is controlled such that the first adhesive layer is irradiated in the first region, but not in the second region, and/or is irradiated in the second, but not in the first region, is preferably used as radiation source. This can be achieved for example by corresponding actuation of a control element that determines the position of the laser or the deflection angle of the laser beam.

Further preferably, an exposure mask is arranged in the beam path between radiation source and first adhesive layer, which is formed and arranged such that the first adhesive layer is irradiated in the first region, but not in the second region, or the first adhesive layer is irradiated in the second region, but not in the first region. The exposure mask here can be for example part of a drum or flatbed imagesetter.

The transfer ply is preferably used to control the irradiation of the first adhesive layer.

For this, the first adhesive layer is preferably irradiated by a radiation source arranged in the direction of the side of the transfer ply facing away from the first carrier ply, preferably carrier film, and arranged spaced apart from the transfer ply. The transfer ply is thus arranged in the beam path between radiation source and first adhesive layer.

The transfer ply preferably has an opaque layer provided in the first or second region and not provided in the second or the first region respectively, which is used as a masking layer to control the irradiation of the first adhesive layer. It is thus possible for example to use a metallic reflective layer of the transfer ply as a masking layer to control the irradiation of the first adhesive layer. It is hereby possible to control the exposure of the first adhesive layer register-accurately in relation to the design of the decorative layer.

The metallic reflective layer is preferably a metal layer made of chromium, copper, silver or gold or an alloy of such metals, which can be vapor-deposited for example under vacuum in a layer thickness of from 0.01 μm to 0.04 μm.

In a first irradiation step, the first adhesive layer is preferably irradiated, before the second carrier film is applied, by a radiation source arranged in the direction of the side of the transfer ply facing away from the first carrier film and arranged spaced apart from the transfer ply, through the ply acting as masking layer, and deactivated in the second region. In a second irradiation step, the first adhesive layer is then irradiated, after the second carrier ply, preferably carrier film, has been applied, by a radiation source arranged in the direction of the side of the second carrier ply, preferably carrier film, facing away from the first carrier ply, preferably carrier film, and arranged spaced apart from the second carrier ply, preferably carrier film, and activated in the first region.

The exposure of the first adhesive layer can—as described above—be effected in one step. However, it is also possible for the exposure to be effected in multiple steps. It is thus possible for example that although the adhesive layer is activated in a first exposure step, a complete curing of the adhesive is not yet effected. After the second part of the base film has been removed, the remaining film with the second carrier ply, preferably carrier film, and the first part of the base film is then post-irradiated, wherein the first adhesive layer cures completely.

The transfer ply can preferably contain marks, which can be used to determine the first and second region of the first adhesive layer and/or to determine the first and second partial regions of the base film. These marks thus represent register marks. The marks can be formed of a printing material, of a surface relief, of a magnetic or an electrically conductive material. The marks can thus for example be optically readable register marks which differ from the background in their color value, their opacity or their reflective properties. The marks can also be a macroscopic or diffractive relief structure which deflects the incident light in a predefined angle range and differ optically from the background region through these properties. The register marks can, however, also be register marks that are detectable by means of a magnetic sensor or a sensor detecting the electrical conductivity. The marks are detected, for example by means of an optical sensor, and the severing of the carrier ply, preferably carrier ply, the activation of the first adhesive layer, the deactivation of the first adhesive layer and/or the application of the first adhesive layer is then controlled by means of the marks. The transfer ply thus has for example optically readable register marks, which controls the irradiation of the first adhesive layer and preferably also the severing of the first carrier ply along the boundary line between the at least one first partial region and the second partial region. Both a register-accurate activation of the first adhesive layer and a register-accurate severing of the carrier ply, preferably carrier film, in relation to the design of the transfer ply is hereby also possible.

The marks are preferably arranged in the second partial region of the base film. Here the marks can be formed for example as lines or strips, which preferably run transversely to the longitudinal direction of the film web which forms the base film. Here, the marks are preferably arranged between two first regions of the base film.

Preferably, one or more register marks are further allocated to each first part of the base film.

Further, it is also possible for the first adhesive layer to be formed by a hot-melt adhesive layer or by a pressure-activatable adhesive layer.

Further, it is also possible for the first adhesive layer to be formed by a latent-reactive adhesive layer, preferably by a latent-reactive hot-melt adhesive layer. A latent-reactive adhesive layer is an adhesive layer which is not yet completely cured after activation and the complete curing of which and thus development of the full adhesive strength is only achieved after a predefined period of time from activation under predefined environmental conditions. If it is a latent-reactive hot-melt adhesive layer or a latent-reactive cold adhesive layer, for example, the adhesive layer is activated in a first step by temperature and/or pressure and achieves between 10% and 90% of the maximum adhesive strength here. After a predetermined time that is dependent on the adhesive composition, for example 10 minutes to 72 hours, the adhesive layer then cures completely and develops its full adhesive strength. For example, after the second part of the base film has been removed, the remaining film with the second carrier ply, preferably carrier film, and the first part of the base film is thus stored for a predefined time at room temperature and optionally increased temperature to cure the latent-reactive adhesive layer, and thus a complete curing of the latent-reactive adhesive layer is achieved. By activation of the first adhesive layer is in particular meant in this connection an effect on the adhesive layer which causes the adhesive layer to trigger a chemical reaction which leads to an at least 10% increase in the adhesive strength after the chemical reaction is substantially complete.

A microencapsulated reactive adhesive can also be used as latent-reactive adhesive, such as is available from Ebnöther AG, Sempach, Switzerland, e.g. under the name Purbond HCMO. Such an adhesive can for example be applied to the first or second carrier ply, preferably carrier film, in a powder-coating method at temperatures between approximately 60° C. and 70° C., wherein through the fixing taking place at this temperature a varnish-like adhesive layer is formed, which is not yet activated. Through the exertion of heat and/or pressure, the microcapsules are broken open and the adhesive cures in this region.

According to a preferred embodiment example of the invention, the first adhesive layer consists of a hot-melt adhesive and the first adhesive layer is activated by means of a heated stamping die in the first, but not in the second region, before the second part of the base film is removed.

Further, it is also advantageous if the first adhesive layer is deactivated in the second region by means of overprinting with a deactivation layer or the first adhesive layer is printed onto the first and/or second carrier ply, preferably carrier film, in the first region, but not in the second region. Further, it is also possible for the first adhesive layer to be applied with a different area density in the first region and in the second region, with the result that the average adhesive strength per unit area, in particular per $cm^2$, differs in the first and second regions.

Further, it is also advantageous if the first adhesive layer is deactivated in the second region by means of overprinting with a deactivation layer or the first adhesive layer is printed onto the first and/or second carrier film in the first region, but not in the second region. The deactivation layer can be, for example, made of silicone or silicone-containing materials or of polytetrafluoroethylene (PTFE, Teflon®).

In this embodiment, the first adhesive layer is preferably printed on in a punctiform pattern in the first and/or second surface region, wherein the difference in the area density can be achieved by varying the dot sizes and/or the grid widths between the adhesive spots. Further, it is also possible for this purpose to apply the adhesive layer over the whole surface in the first region and to apply the adhesive layer only in the form of a dot grid in the second region, or not to apply the first adhesive layer in the second region and to apply the adhesive layer in a dot grid in the first region. The average surface coverage of the first and/or second carrier ply, preferably carrier film, with the first adhesive layer in the first region differs from that in the second region here by at least 15%.

The second carrier ply, preferably carrier film, is preferably laminated onto the base film by means of two opposing rollers.

According to a preferred embodiment example of the invention, the transfer ply, the detachment layer and the first carrier ply, preferably carrier film, are completely severed along the boundary line defining the at least one first partial region. Here, it is also possible for the second carrier ply, preferably carrier film, also to be partially severed. Here, however, care is preferably to be taken that the second carrier ply, preferably carrier film, is less than 50%, preferably less than 90%, severed.

The first carrier ply, preferably carrier film, is preferably severed by means of punching, for example by means of a rotary die cutter or by means of a laser.

The first carrier ply, preferably carrier film, is preferably severed registered relative to the boundary line between the first and second regions. The method according to the invention on the other hand does not require a high register accuracy between the process that structures the first adhesive layer (exposure, printing, stamping) and the severing process (punching), with the result that cost-effective, large-scale industrial processes can be used.

It is further advantageous that the film body formed by the base film, the second carrier ply, preferably carrier film, and the first adhesive layer is processed by means of a hot-stamping die, which at the same time activates the first adhesive layer in the first partial region and at least partially punches through the first carrier ply, preferably carrier film, along the boundary line defining the at least one first partial region. A very high register accuracy between these two processes is hereby achieved and furthermore the number of processing steps is reduced.

After the second part of the base film has been removed, the remaining film with the second carrier ply, preferably carrier film, and the first part of the base film is preferably used as transfer film, in particular hot-stamping film, for the production of the microfluidic array according to the invention.

It is further possible for this transfer film to have a plurality of first partial regions, which each comprise an at least analysis element, which is used in each case by means of transfer onto a base ply.

For example, one or more analysis elements, which are for example in fluid connection with each other after the transfer, can be transferred onto a base ply.

After the second part of the base film has been removed, for this purpose the remaining film with the second carrier ply, preferably carrier film, and the first part of the base film can preferably be placed on a target substrate, one or more first partial regions of the base film can be applied to the target substrate by activating an adhesive layer arranged between the decorative ply and the target substrate, and the multilayer body comprising the first carrier ply, preferably carrier film, the first adhesive layer and the second carrier ply, preferably carrier film, can be removed from the transfer ply of the applied one or more first partial regions of the base film.

For this, a second adhesive layer, which is preferably a hot-melt adhesive layer, is applied to the side of the transfer ply facing away from the first carrier ply, preferably carrier film. Further, it is also possible that the second adhesive layer is a cold adhesive layer or a latent-reactive hot-melt adhesive layer.

Different adhesives are preferably used for the first adhesive layer and for the second adhesive layer. Thus, it is for example possible to use a cold adhesive for the first adhesive layer and a hot-melt adhesive for the second adhesive layer. If hot-melt adhesive layers are used as first and as second adhesive layer, it is advantageous to choose hot-melt adhesive layers which have different activation temperatures, wherein the activation temperature of the first adhesive layer is higher than that of the second adhesive layer. The transfer result is hereby improved.

A transparent plastic film of a thickness of more than 6 μm, preferably of a thickness between 6 μm and 250 μm, is preferably used as second carrier film. However, it is also possible to use a paper substrate or Teslin® (matte, white, uncoated single-ply polyethylene film) as second carrier film. A plastic film of a thickness between 4 μm and 75 μm is preferably used as first carrier film.

According to a preferred embodiment example of the invention, two or more first partial regions are provided and each of the first partial regions is surrounded by the second partial region formed as a coherent region. This facilitates removal of the second region of the base film.

The first region preferably covers at least 50% of each first partial region, further preferably more than 70% of each first partial region. It is further also possible that the first region completely covers each first partial region. Further, the second partial region covers the first region preferably by less than 5%. This measure further ensures that the second part of the base film can be removed with high reliability.

In the method according to the invention, the previously described base film can be formed both as a transfer film and as a laminating film. If the base film is formed as a transfer film, then in particular the transfer ply of the base film is transferred onto a substrate and subsequently the first carrier ply, preferably carrier film, is removed therefrom and preferably remains on the second carrier ply, preferably carrier film. Here, a detachment layer is particularly preferably arranged between transfer ply and first carrier ply, preferably carrier film.

If the base film is formed as a laminating film, then in particular the transfer ply and the first carrier ply, preferably carrier film, of the base film are transferred onto a substrate and subsequently the second carrier ply, preferably carrier film, is removed therefrom. Here, a detachment system is particularly preferably arranged between the first and the second carrier ply, preferably carrier film.

Moreover, different shapes of the transfer film can be transferred with a uniform die shape. It is also possible to transfer several, adjacent, isolated patches by means of a single die. The outer shape of the patch need not match the outer shape of the hot-stamping die. Here, the hot-stamping die is preferably chosen larger than the part of the base film to be transferred.

In addition to a hot-stamping die with which a hot stamping is carried out by means of stamping pressure and heat, an ultrasonic stamping die with correspondingly designed thrust bearing can also be used, with which a hot stamping is carried out by means of stamping pressure and ultrasound as an alternative form of energy. It is likewise possible to use a roll laminator, in particular a semi-rotary laminator and/or multi-roll laminator (for example, for banknote applications, several lamination rollers are arranged one behind another in a row). It is furthermore possible to bring the first carrier ply, preferably carrier film, close to the second carrier ply, preferably carrier film, printed with UV adhesive with the aid of a guide roller without pressing the two carrier plies, preferably carrier films, together. Additional, following guide rollers then ensure the necessary contact between the two carrier plies, preferably carrier films, before the curing with UV light.

It is also possible that the second partial region is not coherent or also has sub-regions in which the entire composite film is removed. For example, in an embodiment each patch can have at least one enclosed free space, for example an inlet and/or outlet. The inlet and/or outlet can for example also be produced during the punching procedure. The inlet and/or outlet and/or also other through-holes or apertures can for example also be produced in a separate operation, for example in a separate punching procedure and/or in a separate laser procedure and/or in a separate milling pass.

The punching sheet used has two punching heights, for example; one in order to sever only the transfer ply for the release of first regions and the optionally present mark region to be retained and another higher one in order to sever the entire composite film and thus to produce a hole. Lasers with different settings for kiss cutting and punching through is also possible in principle. The film fragments forming in the process are usually pressed out or blown out of the composite film. In this partial region the entire composite film is thus removed.

The second carrier ply, preferably carrier film, can be both single-ply and multi-ply. The plies can consist of different or the same materials, for example of paper and/or fabric and/or Teslin® and/or the same or different plastic layers. They can be glued to each other or for example produced by coextrusion or by multiple coatings.

Different adhesives, in particular differently activatable adhesives, are therefore preferably used for the first and second adhesive layer. In particular, it is advantageous to use a radiation-activatable adhesive for the first adhesive layer and a thermally activatable adhesive for the second adhesive layer. A thermally activatable adhesive can be both reactive and non-reactive. Multilayered structures are moreover possible. In addition to radiation-activatable adhesives, other reactive types of adhesive are also possible, such as for example one- and two-component systems (epoxy systems and/or for example with isocyanates as polymerization or crosslinking initiator).

It is advantageous here if the second adhesive layer is activated when the first part of the base film is hot-stamped onto a substrate. Before the hot stamping, the second adhesive layer therefore preferably has no tack. During the hot stamping and the activation, the interlayer adhesion between the carrier plies is then increased, preferably by more than 50%, preferably more than 100%, particularly preferably more than 200%.

It is preferred if the hot stamping is effected at a temperature of from 80° C. to 300° C., preferably from 100° C. to 240° C., particularly preferably from 100° C. to 180° C. and/or with a stamping pressure of from 10 N/cm$^2$ to 10,000 N/cm$^2$, preferably from 100 N/cm$^2$ to 5000 N/cm2 and/or with a stamping time of from 0.01 s to 2 s, preferably from 0.01 s to 1 s.

It is further advantageous if the second adhesive layer is dried before the second carrier ply, preferably carrier film, is applied to the base film. It is hereby ensured that the second adhesive layer has no tack before the hot stamping. Varying degrees of surface coverage of the second adhesive layer (for example different degrees of surface coverage in the inner or outer regions in the first partial region) can also be used. It is furthermore advantageous if the second adhesive layer is applied in a grid, in particular a line grid or dot grid with a grid density of from 40 lines per cm to 80 lines per cm.

It is particularly preferred if the second adhesive layer is formed of a thermoplastic adhesive with a glass transition temperature of from 50° C. to 150° C., preferably from 100° C. to 120° C. The second adhesive layer can be constructed multilayered.

It is expedient if the second adhesive layer is deposited with a weight per unit area of from 0.1 g/m$^2$ to 10 g/m$^2$, preferably from 2 g/m$^2$ to 5 g/m$^2$.

It is furthermore advantageous if the first adhesive layer is applied in a grid, in particular a line grid or dot grid with a grid density of from 40 lines per cm to 80 lines per cm. Varying degrees of surface coverage of the first adhesive layer (for example different degrees of surface coverage in the inner or outer regions in the first partial region) can also be used.

It is expedient if the first adhesive layer is deposited in the region of the printed grid with a layer thickness of from 0.01 μm to 10 μm, preferably from 2 μm to 5 μm.

By the only partial application of the first adhesive layer it is ensured that the second adhesive layer is in direct contact with both transfer plies and in this way can increase the adhesion in the desired manner.

The detachment system preferably consists of a wax-like material which softens in particular due to the heat arising during a hot-stamping procedure. The overall thickness of the detachment system is preferably between 0.01 μm and 4 μm. is softened and makes a reliable separation of the second carrier film possible.

The detachment system can be constructed multilayered. It comprises for example a layer made of wax and a layer made of a varnish. Acrylates, polyurethanes or cellulose derivatives can be used as varnishes. The varnish layer preferably has a thickness in the range of from 0.1 μm to 3 μm, preferably in the range of from 0.2 μm to 1.5 μm.

The layers of the detachment system on the multilayer body or on the security element preferably have substantially the same area size as the security element or as the first partial regions after application to the target substrate. This is made possible in particular in that during the application the detachment system is only activated inside the first partial region and is not activated in the adjacent second partial region, and therefore the detachment layer system remains on the second carrier film in the second partial region. The small thickness of the detachment system makes possible a sharp-edged separation of the detachment layer system at the outer edges of the first partial region.

One or more layers of the detachment system preferably remain on the security element after application to the target substrate. This is preferably the case when the detachment system is arranged between the second carrier film and the adhesive layers. It is hereby possible with the aid of these layers to provide the outer surface of the multilayer body or security element with additional functions. Examples are a better wettability or overprintability with further functional layers or, conversely, a hydrophobic function or functions to repel other liquids or also the generation of optical matting and/or of an optical gloss and/or the generation of particular tactile properties. It is also possible to add additional security prints in the visible wavelength range, UV range or IR range. Individual or all layers of the detachment layer system can be provided over the whole surface or only in partial surface regions.

It is further possible for one or more auxiliary layers to be applied to the side of the first carrier ply, preferably carrier film, of the base film facing away from the transfer ply before the detachment system is applied. The auxiliary layers are therefore then arranged between the first carrier ply, preferably carrier film, and the detachment system.

Examples are better wettability or overprintability with further functional layers or, conversely, a hydrophobic function or functions to repel other liquids or also the generation of optical matting and/or of an optical gloss and/or the generation of particular tactile properties.

Individual or all layers of the detachment layer system can be provided over the whole surface or only in partial surface regions.

The one or more layers of the detachment system are preferably detached from the transfer ply after application to the base substrate and the auxiliary layers form the outer, free surface of the cover ply.

The second carrier ply, preferably carrier film, is preferably laminated onto the base film by means of two opposing rollers.

In a preferred embodiment, a microfluidic array of the present invention is formed as a cuvette.

A microfluidic array according to the present invention or of a measuring system according to the present invention can be used in particular in the in-vitro examination of human or animal body fluids, in particular in in-vitro blood analysis.

BRIEF DESCRIPTION OF THE DRAWINGS

In the following the invention is explained by way of example with reference to several embodiment examples utilizing the attached drawings.

DETAILED DESCRIPTION

In the figures, the same elements or elements with the same function have been provided with the same reference numbers, unless otherwise indicated.

Figure 1:
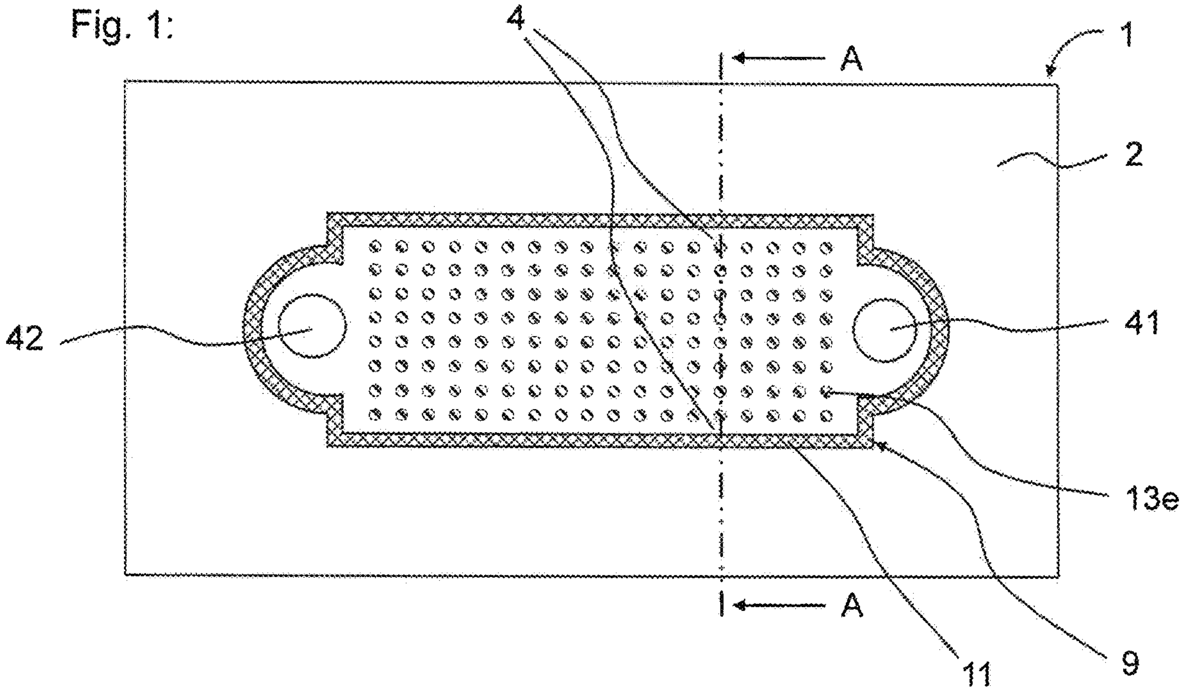
FIG. 1 shows a schematic top view of a microfluidic array.

FIG. 1 shows in a schematic top view a microfluidic array 1 comprising a, preferably stiff, base ply 2 and a flexible cover ply 9 arranged thereon. The cover ply 9 comprises an at least partially covered flow channel 4 and a first adhesive layer 11, which is arranged between the base ply 2 and the cover ply 9, preferably at the edge of the cover ply 9, and spaces base ply 2 and cover ply 9 apart. The flow channel 4 arranged in the microfluidic array 1 is in fluid connection with inlet 41 and outlet 42, wherein inlet 41 and outlet 42 can each be formed as an at least round or oval perforation of cover ply 9. The flow channel 4 furthermore has a plurality of structural elements 13*v* formed as elevations.

Figure 2:
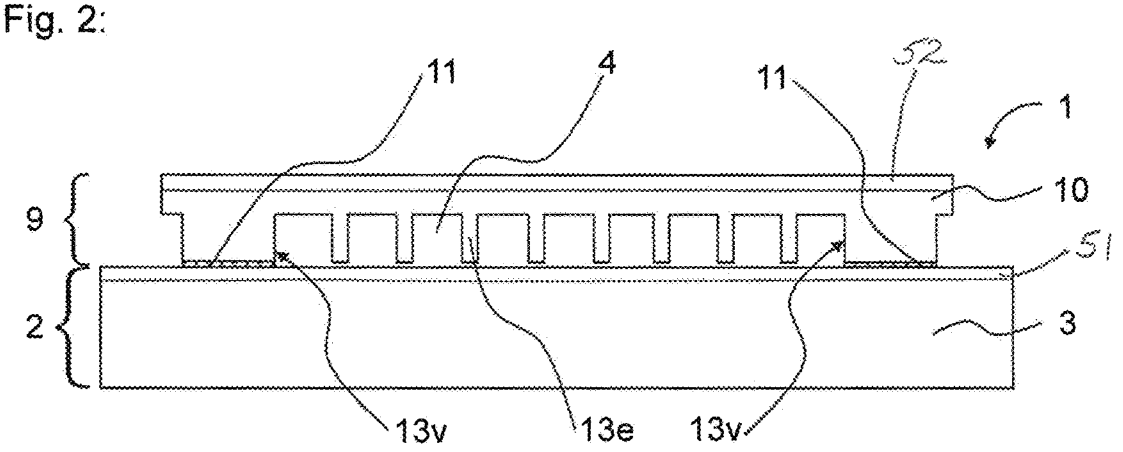
FIG. 2 shows a schematic sectional representation of an embodiment of a microfluidic array.

FIG. 2 shows a cross-sectional view of a preferred embodiment of the microfluidic array 1. The section runs for example along a line A-A in FIG. 1. The microfluidic array comprises a, preferably stiff, base ply 2, which is composed of a base layer 3, and a flexible cover ply 9 arranged thereon. The cover ply 9 comprises a cover layer 10 and a first adhesive layer 11, which is arranged on the surface of the cover layer 10 facing the base ply 2 and spaces cover layer 10 and base ply 2, preferably base layer 3, apart. The cover layer 10 has a structural element 13*v* in the form of a depression, which is arranged in a surface of the side of the cover layer 10 facing the base ply 2. After the side of the cover ply 9, preferably cover layer 10, having the structural element 13*v* has been arranged on the base ply 2, preferably base layer 3, the structural element 13*v* substantially forms the flow channel 4. In the embodiment shown, the flow channel 4 furthermore has several structural elements 13*e* in the form of convex elevations. The structural element 13*e* is arranged on a surface of the side of the flow channel 4 lying opposite the base ply 2 such that, in the embodiment shown in FIG. 2, a spacing is preferably formed between the side of the base ply 2, preferably base layer 3, facing the cover ply 9 and the at least one structural element 13*e* in an unfilled state of the microfluidic array. Of course, embodiments in which the spacing shown is not present in the unfilled state are also conceivable. In a filled state of the microfluidic array shown for example in FIG. 4*b*, the cover ply 9 is "sucked" onto the base ply 2, in particular by capillary forces, such that this spacing is no longer present and the height of the structural elements 13*e* defines the height of the flow channel 4.

The at least one, preferably stiff, base ply 3 can furthermore have at least one decorative element 51, wherein the at least one decorative element 51 influences the surface texture, and/or the color of the surface, of the at least one, preferably stiff, base ply 3, wherein the at least one decorative element 51 is preferably formed as a motif, as a decoration, for example single-image decoration or endless decoration, as a pattern, or a combination thereof. Preferably, the at least one decorative element 51 is formed, at least in regions, as a decorative layer.

Preferably, the at least one flexible cover ply 9 furthermore has at least one decorative element 52, wherein the at least one decorative element 52 influences the surface texture, and/or the color of the surface, of the at least one flexible cover ply 9, preferably cover layer, wherein the at least one decorative element 52 is preferably formed as a motif, as a decoration, for example single-image decoration or endless decoration, as a pattern, or a combination thereof. Further preferably, the at least one decorative element 52 is formed, at least in regions, as a decorative layer.

Figure 3:
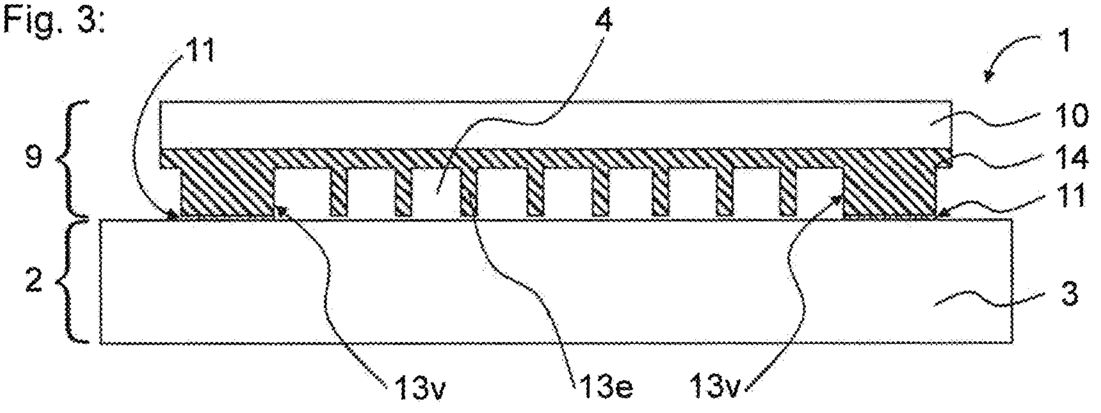
FIG. 3 shows a schematic sectional representation of a further embodiment of a microfluidic array.

FIG. 3 shows a cross-sectional view of a preferred embodiment of the microfluidic array 1. The section runs for example along a line A-A in FIG. 1. The microfluidic array comprises a, preferably stiff, base ply 2, which is composed of a base layer 3, and a cover ply 9 arranged thereon. The cover ply 9 comprises a cover layer 10, a first varnish layer 14 arranged on a surface of the side of the cover layer 10 facing the base ply 2, and a first adhesive layer 11, which is arranged on a surface of the side of the first varnish layer 14 facing the base ply 2. The first varnish layer 14 has a structural element 13*v* in the form of a depression, which is arranged in a surface of the side of the first varnish layer 14 facing the base ply 2. After the side of the cover ply 9, preferably varnish layer 14, having the structural element 13*v* has been arranged on the base ply 2, preferably base layer 3, the structural element 13*v* substantially forms the flow channel 4. In the embodiment shown, the flow channel 4 furthermore has several structural elements 13*e* in the form of convex elevations. The structural element 13*e* is arranged on a surface of the side of the flow channel 4 lying opposite the base ply 2 such that, in the embodiment shown in FIG. 2, a spacing is preferably formed between the side of the base ply 2, preferably base layer 3, facing the cover ply 9 and the at least one structural element 13*e* in an unfilled state of the microfluidic array. Of course, embodiments in which the spacing shown is not present in the unfilled state are also conceivable. In a filled state of the microfluidic array shown for example (there on the basis of a slightly modified structure) in FIG. 4*b*, the cover ply 9 is "sucked" onto the base ply 2, in particular by capillary forces, such that this spacing is no longer present and the height of the structural elements 13*e* defines the height of the flow channel 4.

Figure 4A:
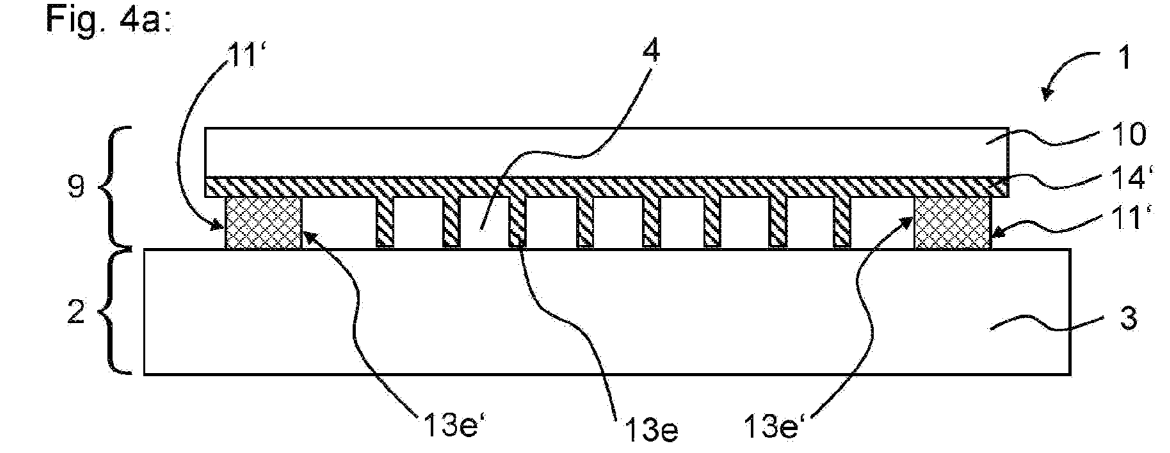
FIG. 4*a* shows a schematic sectional representation of a further embodiment of a microfluidic array.
Figure 4B:
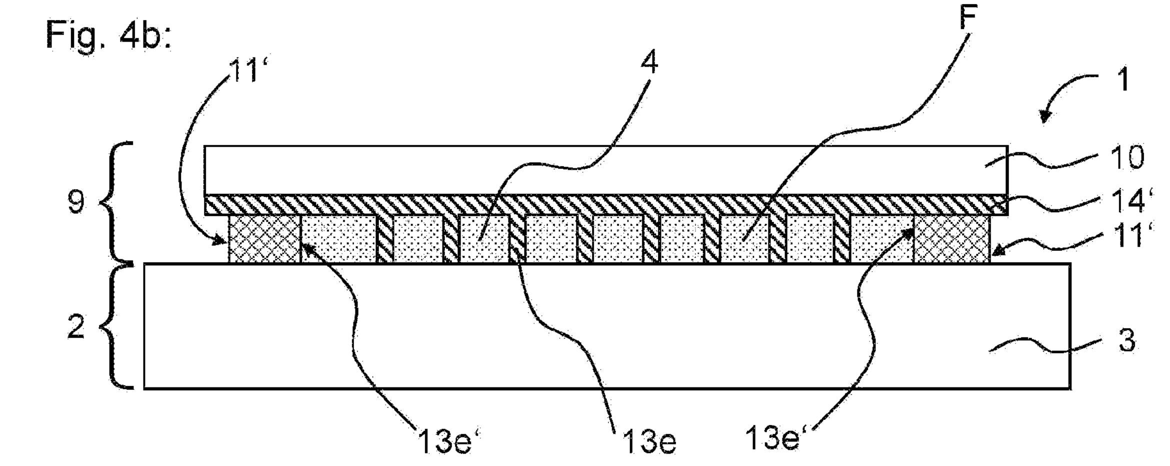
FIG. 4*b* shows a schematic sectional representation of a further embodiment of a microfluidic array in the filled state.

FIG. 4*a* and FIG. 4*b* in each case shows a cross-sectional view of a preferred embodiment of the microfluidic array 1 in the unfilled state (FIG. 4*a*) or after a fluid F to be examined, for example in the form of a solution, a suspension or emulsion, has been introduced (FIG. 4*b*). The section runs for example along a line A-A in FIG. 1. The microfluidic array comprises a, preferably stiff, base ply 2, which is composed of a base layer 3, and a cover ply 9 arranged on it. The cover ply 9 comprises a cover layer 10, a first varnish layer 14' arranged on a surface of the side of the cover layer 10 facing the base ply 2, and a first adhesive layer 11', which is arranged on a surface of the side of the first varnish layer 14' facing the base ply 2. The first adhesive layer 11' forms at least one structural element 13*e*' in the form of an elevation, After the side of the cover ply 9, preferably varnish layer 14', having the structural element 13*e*' has been arranged on the base ply 2, preferably base layer 3, the structural element 13*e*' substantially forms the flow channel 4. In the embodiment shown, the flow channel 4 furthermore has several structural elements 13*e* in the form of convex elevations. The structural element 13*e* is arranged on a surface of the side of the flow channel 4 lying opposite the base ply 2 such that, in the embodiment shown in FIG. 2, a spacing is preferably formed between the side of the base ply 2, preferably base layer 3, facing the cover ply 9 and the at least one structural element 13*e* in an unfilled state of the microfluidic array. Of course, embodiments in which the spacing shown is not present in the unfilled state are also conceivable. In a filled state of the microfluidic array shown for example in FIG. 4*b*, the cover ply 9 is "sucked" onto the base ply 2, in particular by capillary forces, such that this spacing is no longer present and the height of the structural elements 13*e* defines the height of the flow channel 4.

As is represented in FIG. 4*b*, in the presence of a fluid F to be examined the flexible cover ply 9 is preferably "sucked" by capillary pressure onto the at least one base ply 2, with the result that no spacing is present between the at least one structural element 13*e* and the side of the base ply 2, preferably base layer 3, facing the cover ply 9 and the at least one structural element 13*e* comes into direct contact with the base ply 2, preferably base layer 3.

This produces a defined spacing of the plies and thus also a defined volume of the flow channel 4.

The adhesive layer 11' preferably has a thickness, which corresponds to the height of the structural element 13*e*, preferably from a range of from 0.2 μm to 500 μm, preferably from a range of from 0.15 μm to 270 μm, preferably from a range of from 0.2 μm to 170 μm, preferably from a range of from 0.5 μm to 100 μm, further preferably from a range of from 0.65 μm to 75 μm, further preferably from a range of from 0.75 μm to 55 μm, further preferably from a range of from 0.85 μm to 35 μm, further preferably from a range of from 0.95 μm to 20 μm, in particular from a range of from 1 μm to 10 μm.

As described previously, this direct contact further preferably leads to an altered brightness of the at least one structural element 13*e* in transmitted light. The change in the brightness of the at least one structural element 13*e* in transmitted light can be used as a reference or as a measuring element of whether the desired height of the at least one flow channel 4, which preferably corresponds to the height of the at least one structural element 13*e*, has been established.

The base ply 2, preferably the base layer 3, in FIG. 1 to FIG. 4*b* is preferably composed of at least one polymer and/or at least one glass and/or at least one metal and/or at least one semiconductor material or a combination thereof.

Figure 5A:
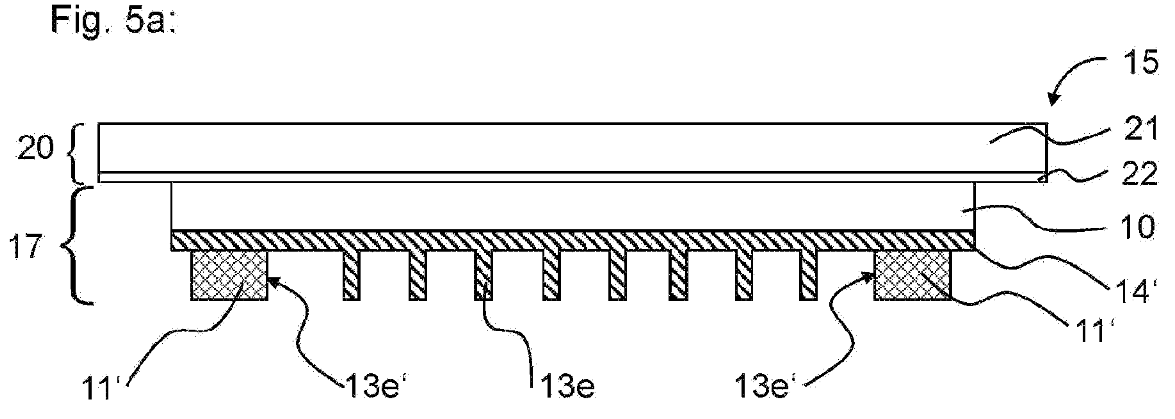
FIGS. 5*a* and 5*b* each show a schematic sectional representation of a further embodiment of a transfer film.
Figure 5B:
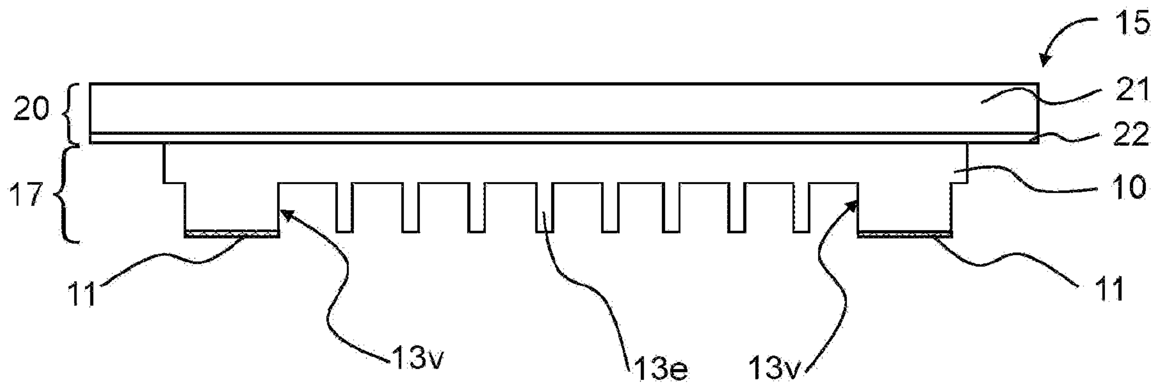

FIGS. 5*a* and 5*b* each show a cross-sectional view of a preferred embodiment of a transfer film 15 used in the method according to the invention comprising a first carrier ply 20 and a transfer ply 17 arranged thereon. After the transfer film 15 has been applied with the side of the transfer ply 17 facing away from the transfer ply 20 to a base ply 2 and the transfer ply 20 has subsequently been removed, transfer ply 17 preferably forms the cover ply 9 of the microfluidic array 1.

The carrier ply 20 preferably comprises a first carrier film 21 and a first detachment layer 22 arranged on the side facing the transfer ply 17.

The transfer ply 17 of the transfer film 15 used according to the invention preferably has the elements of the cover ply 9 described by way of example above in FIG. 2, FIG. 3 and FIG. 4*a*, wherein the elements of the cover ply 9, for example cover layer 10, first varnish layer 14, 14' and first adhesive layer 11, 11' as well as structural elements 13*v*, 13*e*, 13*e'*, are provided by sequentially arranging the corresponding layers on a side of the first carrier ply 20, preferably the side of the first detachment layer 22 facing away from the first carrier film 21, and by using corresponding application and/or molding methods for the production of the structural elements.

The transfer film 15 represented by way of example in FIG. 5*a* preferably has a cover layer 10 arranged on the side of the first detachment layer 22 facing away from the first carrier film 21. A first varnish layer 14' is preferably furthermore arranged on the side of the cover layer 10 facing away from the first carrier ply 20.

For example, the cover layer 10 can be formed of a PET film with a thickness of 23 μm, on which a coating consisting of a preferably radiation-curing or thermoplastic first varnish layer 14' with a thickness of 8 μm that is printed on and/or poured on and/or applied with a doctor blade and/or sprayed on is arranged.

Structural elements 13*e*, which preferably have, in any direction in the plane, a spacing of approx. 50 μm from the respectively next structural element 13*e*, are for example arranged on a surface of the side of the first varnish layer 14 facing away from the first carrier ply 20. Further preferably, it is sufficient if the minimum spacing between two structural elements 13*e* corresponds to approximately twice to four times the thickness of the, in particular multilayered, flexible transfer ply 17.

At least one structural element 13*e* and/or 13*v* is preferably arranged on a surface of the side of the first varnish layer 14, 14' facing away from the first carrier ply 20 by molding the at least one structural element 13*e* for example using a molding tool, for example printing roller or stamping roller or replication tool, and subsequently curing the first varnish layer 14, 14', which is formed as a UV-curable varnish layer, by electromagnetic radiation, for example UV radiation.

A UV-curable varnish can be formulated particularly flowable, with the result that it is also able to completely fill the narrowest cavities of the printing roller or stamping roller or replication tool. The UV-curable varnish can be cured directly by UV light, which is transmitted for example through the rear side of the cover layer 10. The UV-curable varnish can be deposited over the whole surface or only locally to a limited extent and can be cured through the rear side of the cover layer 10 or through a transparent printing roller.

The UV-curable varnish can be for example one of the following varnishes: monomeric or oligomeric polyester acrylates, polyether acrylates, urethane acrylates or epoxy acrylates as well as amine-modified polyester acrylates, amine-modified polyether acrylates or amine-modified urethane acrylates.

However, it can also be provided that the varnish of the first varnish layer 14, 14' is an in particular at least partially dried thermoplastic varnish, which is replicated under pressure and temperature. It can be for example a varnish of the following composition:

| Constituent | Parts by weight |
|---|---|
| Methyl ethyl ketone | 400 |
| Ethyl acetate | 260 |
| Butyl acetate | 160 |
| Polymethyl methacrylate (softening point approx. 170° C.) | 150 |

After varnish layer 14, 14' has cured, the first adhesive layer 11, 11' is preferably applied to at least partial regions of a surface of the side of the first varnish layer 14, 14' facing away from the first carrier ply 20.

The transfer film 15 represented by way of example in FIG. 5*b* has the carrier ply 20 and a transfer ply 17 arranged thereon comprising a cover layer 10 and at least one structural element 13*v* in the form of a depression, which is arranged in a surface of the side of the cover layer 10 facing away from the first carrier ply 20. Further preferably, cover layer 10 has at least one structural element 13*e* in the form of an elevation, which are arranged on a surface of the depression formed by the structural element 13*v*.

For example, cover layer 10 can be formed of a thermoplastic film, for example a PET film with a thickness of 30 μm, in which at least one structural element 13*v* is arranged, preferably introduced. At least one structural element 13*v*, as well as preferably the at least one structural element 13*e*, can be introduced into a surface of a side of the cover layer 10, for example under pressure and temperature.

After the at least one structural element 13*v* and further preferably the at least one structural element 13*e* have been arranged, the first adhesive layer 11 is preferably applied to at least partial regions of a surface of the side of the cover layer 10 facing away from the first carrier ply 20, preferably to at least partial regions of a surface of the at least one structural element 13*v*.

In a further embodiment, the cover layer 10 can be applied to the first carrier ply 20, preferably carrier film 21, in the form of a preferably radiation-curing or thermoplastic varnish layer that is printed on and/or poured on and/or applied with a doctor blade and/or sprayed on. Subsequently, at least one structural element 13*v* is introduced into the surface of the side of the applied varnish layer lying opposite the first carrier ply 20, for example by molding, and the applied and molded varnish layer is cured, preferably crosslinked, for example by the action of electromagnetic radiation, to obtain transfer film 15.

The cover layer 10 preferably consists of a varnish, in particular of a thermoplastic varnish or of a UV-curable varnish, in a layer thickness of from 0.5 μm to 500 μm.

In a preferred embodiment, the cover layer 10 can also consist of a thin PET carrier, which is provided with a UV-curable varnish 22 and is laminated bubble-free onto the first carrier film 21.

It is furthermore possible to build up the cover layer 10 from different materials locally on the surface, by printing various partial regions. It is particularly advantageous to apply different materials registered relative to different regions of the microfluidic array. The optimum combinations of material and the at least one structural element 13*v* can thereby be realized locally in one cover layer 10.

It can generally be provided to dry or cure the applied varnish, for example by thermal radiation or by contact with a heated body, for example a rotating roller, or by high-energy radiation, in particular UV radiation. A rotary dryer can be provided in order to form the cover layer 10 with a particularly smooth rear side. When UV-curable varnish is used, the curing of the structural layer can be carried out particularly easily through a transparent roller or from the side of the carrier film 21 facing away from the cover layer 10.

It can also be provided to form the cover layer 10 with a location-dependent refractive index by UV curing. The patterned irradiation necessary for this can be generated for example through masks arranged between the radiation source and the structural layer or through the master relief structure.

Further, the cover layer 10 can be formed with a predetermined refractive index, for example in order to set the optical properties of an analysis element 12 arranged in the cover layer 10. A refractive index of between 1.4 and 1.7 is advantageously provided, when the cover layer 10 is applied, for example, to a polymer base ply or to optical glass as base ply.

It can furthermore be provided to form the cover layer 10 particularly resistant to mechanical and/or chemical stresses and/or hydrophobic.

A particularly mechanically resistant UV-curing varnish can have the following composition:

| Constituent | Parts by weight |
|---|---|
| Methyl ethyl ketone | 30 |
| Ethyl acetate | 20 |
| Cyclohexanone | 5 |
| Polymethyl methacrylate (MW 60,000 g/mol) | 18 |
| Dipentaerythritol pentaacrylate | 25 |
| Photoinitiator (e.g. Irgacure 1000 from Ciba Geigy) | 2 |

With the following composition, a UV-curing hydrophobic varnish is obtained:

| Constituent | Parts by weight |
|---|---|
| Methyl ethyl ketone | 28 |
| Ethyl acetate | 20 |
| Cyclohexanone | 5 |
| Polymethyl methacrylate (MW 60,000 g/mol) | 18 |
| Dipentaerythritol pentaacrylate | 25 |
| Photoinitiator (e.g. Irgacure 1000 from Ciba Geigy) | 2 |
| Polysiloxane resin | 2 |

The detachment layer 22 represented in FIG. 5*a* and/or FIG. 5*b* is preferably a UV-activatable adhesive. The adhesive which can be used for the detachment layer 22 has the following composition, for example:

| Dicyclopentyloxyethyl methacrylate | 50-60% |
|---|---|
| 2-Hydroxyethyl methacrylate | 8% |
| Trimethylolpropane triacrylate | 40-30% |
| (3-(2,3-Epoxypropoxy)propyl)trimethoxysilane | 1% |
| Irgacure 184 (CIBA) | 1-2% |

The detachment layer 22 is applied to the carrier film 21 in a layer thickness of from 0.1 μm to 10 μm by means of a printing process, by means of pouring or by means of a doctor blade.

Firstly, at least one detachment layer 22 is preferably first applied to the first carrier ply 20, preferably carrier film 21. Subsequently, as described above, the cover layer 10 in the form of a preferably radiation-curing varnish layer that is printed on and/or poured on and/or applied with a doctor blade and/or sprayed on is applied to the applied detachment layer 22.

Subsequently, at least one structural element 13*v* is introduced into the surface of the side of the applied varnish layer lying opposite the detachment layer 22, for example by molding, and the applied and molded varnish layer is cured, preferably crosslinked, for example by the action of electromagnetic radiation, to obtain a cover layer 10.

In an alternative embodiment, first the varnish layer 14, 14' is applied to the cover layer 10, for example by printing, pouring, application with a doctor blade. Then, at least one structural element 13*v* is introduced into the surface of the side of the applied varnish layer 14, 14' facing away from the cover layer 10, for example by molding, and the applied and molded varnish layer is cured, preferably crosslinked, for example by the action of electromagnetic radiation. Preferably, after the varnish layer 14, 14' has cured, the first adhesive layer 11, 11' is applied to at least partial regions of a surface of the side of the first varnish layer 14, 14' facing away from the cover layer 10. Then, the carrier film 21 with the detachment layer 22 arranged on the carrier film 21 or the cover layer 10 is applied to the side of the cover layer 10 facing away from the varnish layer 14, 14'. The detachment layer is here arranged between the carrier film 21 and the cover layer 10.

Figure 6A:
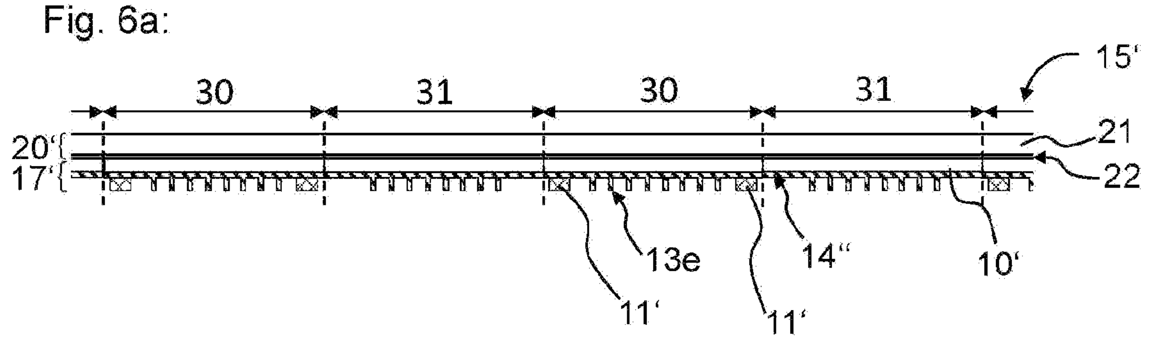
FIG. 6*a* to FIG. 6*c* show schematic sectional representations to illustrate the method steps of the method according to the invention.

FIG. 6*a* shows a transfer film 15' comprising a first carrier ply 20' and a transfer ply 17' arranged thereon. The transfer ply 17' comprises a cover layer 10', a varnish layer 14" arranged on the side of the cover layer 10' facing away from the first carrier ply 20', as well as several structural elements 13*e* arranged on a surface of the side of the varnish layer 14" facing away from the first carrier ply 20'. A first adhesive layer 11' is furthermore arranged on partial regions of a surface of the side of the varnish layer 14" facing away from the first carrier ply 20'.

The transfer film 15' has at least two first partial regions 30 and preferably a second partial region 31 surrounding the first partial regions 30. The first partial regions 30 here represent the part of the transfer film 15' which is preferably to be transferred as transfer ply 17' onto a base ply 2.

The first carrier film 21 is preferably a PET, PEN or BOPP film of a thickness of from 6 μm to 125 μm. First of all, the detachment layer 22 is applied to the first carrier film 21. The detachment layer 22 consists for example of a wax-like material which is softened in particular due to the heat arising during a hot-stamping procedure and makes a reliable separation of the transfer ply 17' from the first carrier ply 20' possible. The thickness of the detachment layer 22 is preferably between 0.01 μm and 1.2 μm. The detachment layer 22 is preferably a UV-activatable adhesive, which further preferably has the composition specified above. Detachment layer 22 is preferably applied to the carrier film 21 by means of a printing process, by means of pouring or by means of a doctor blade.

A protective varnish layer can then be applied in a layer thickness of between 0.5 μm and 1.5 μm. Here, it is also possible for the protective varnish layer to take on the function of the detachment layer 22 and therefore both to make it possible to separate the transfer ply 17' from the carrier ply 20' and also to protect the transfer ply 17' against mechanical influences and environmental influences. Here, it is also possible for the protective varnish layer to be colored or to contain micro- and nanoparticles.

The cover layer 10' can be formed, as a replication varnish layer, of a thermoplastic varnish into which structural elements 13*e* are molded by means of heat and pressure by the action of a stamping tool. Further, it is also possible for the cover layer 10' to be formed by a UV-crosslinkable varnish and for the surface structure to be molded into the cover layer 10' by means of UV replication.

As described above, cover layer 10' can be applied in the form of a preferably radiation-curing varnish layer that is printed on and/or poured on and/or applied with a doctor blade and/or sprayed on.

The cover layer 10' preferably has a layer thickness of between 0.5 μm and 500 μm. The at least one structural element 13*e* molded into the cover layer 10' preferably has in any direction a spacing of from approx. 10 μm to 200 μm, preferably 15 μm to 90 μm, from the respectively next structural element. The spacings in different directions can also be different.

Preferably, after the cover layer 10' has cured, a first adhesive layer 11 is arranged in a layer thickness of from approximately 0.1 μm to 1 μm on partial regions of the surface of the side of the cover layer 10' lying opposite the detachment layer 22. The first adhesive layer 11 preferably consists of a thermally activatable adhesive.

Then, a first region of the detachment layer 22 is activated by exposure to light. For this, transfer film 15' represented in FIG. 6*a* is exposed to UV light in the region 30. A collimated light source can be used for this, which is on the side of the first carrier film 21 facing away from the transfer ply 17' and spaced apart from the first carrier film 21. Here, an exposure mask, which masks the region 31 and thus makes a selective exposure of the region 30 possible, is preferably arranged in the beam path between the light source and the detachment layer 22. The exposure light source and the exposure mask are preferably part of a drum imagesetter, over which the transfer film 15' is guided.

In the region 31, the detachment layer 22 is not exposed by UV light and is thus not activated.

Then, the transfer ply 17' and the first detachment layer 22 are severed along the boundary lines defining the first partial regions 30 and separating the first partial regions 30 from the second partial region 31. These layers are preferably severed by means of a punch.

Here, it is also possible for the punch depth to be chosen such that the first carrier film 21 is also partially severed, for example over 20% to 80% of its thickness.

Figure 6B:
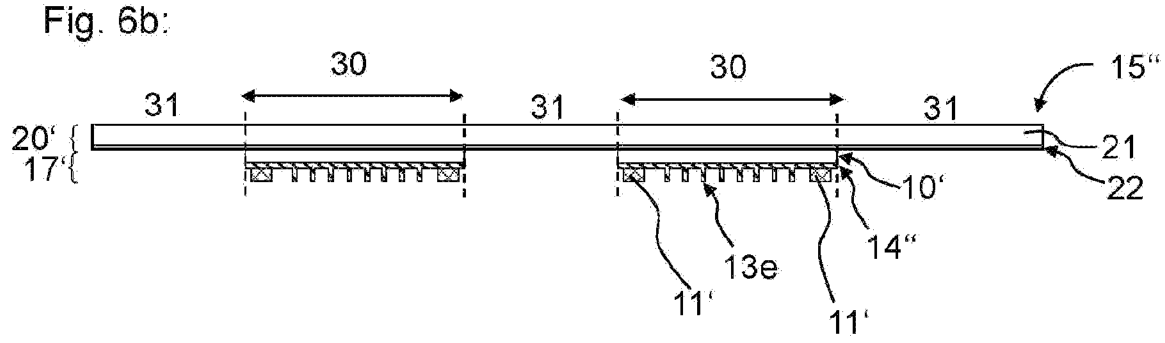

After the severing, the part of the transfer ply 17' comprising the second partial region 31 is removed from the first carrier film 21, wherein the transfer ply 17' remains adhering to the first carrier film 21 in the first partial regions 30 because of the detachment layer 22 activated in the region 31, to obtain a modified transfer film 15" represented in FIG. 6*b*.

Here, as represented in FIG. 6*b*, residues of the non-activated material of the detachment layer 22 can remain on the first carrier film 21 in the region 31. A post-exposure of the film is optionally effected.

Figure 6C:
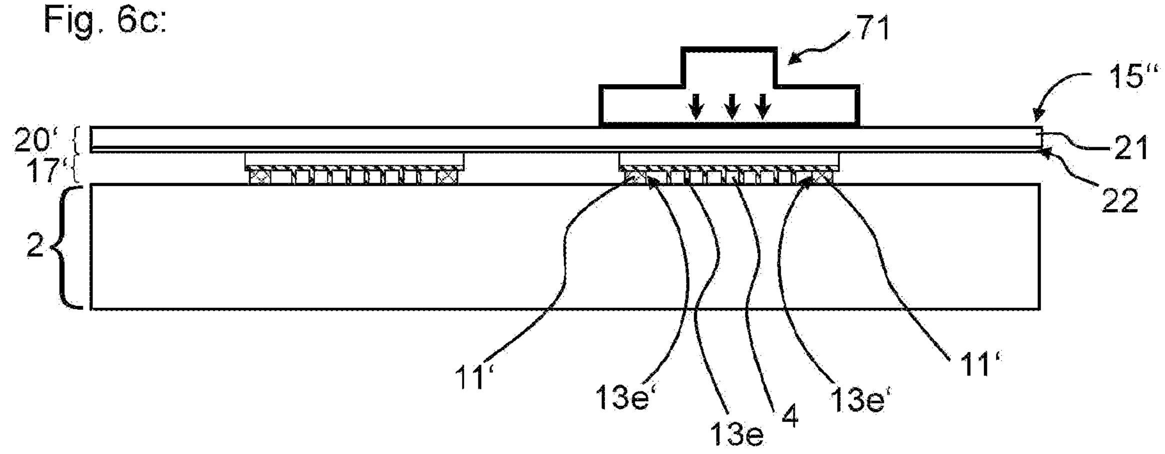

After the partial regions not to be transferred have been applied, the modified transfer film 15" shown in FIG. 6*b* thus results, which can be used to apply at least one transfer ply 17' to a base ply 2. For this, as represented in FIG. 6*c*, the modified transfer film 15" is placed on the base ply 2 and the first adhesive layer 11' is activated in a first partial region, for example by a correspondingly shaped hot-stamping die 71.

Then, the modified transfer film 15" comprising the first carrier film 21 and detachment layer 22 is removed from the applied region of the transfer ply 17', which remains on the base ply 2, with the result that at least one partial region of the at least one base ply 2 is preferably arranged on at least one partial region of the at least one structural element 13*e*, 13*e'* arranged on the surface of at least one side of the transfer ply 17' to at least partially form at least one flow channel 4 that is completely covered at least in regions.

The extraction of from approx. 2 ml to 50 ml of venous or arterial blood is typically effected under laboratory conditions. From this an aliquot or aliquant part is poured into the inlet region of the microfluidic array, optionally after diluting and/or adding reagents or separating off constituents, e.g. by centrifuging.

The quantity of blood poured in is determined by the volume of the inlet and where appropriate of the outlet region as well as of the actual examination chamber. A typical value for an examination chamber with a height of 4 μm and a base surface area of 200 $mm^2$ (10 mm×20 mm) is approx. 0.8 μl (μl=microliters). A typical value for the inlet chamber is e.g. 0.5 μl to 10 μl, with the result that in this example approx. 1.3 μl to 10.8 μl was poured in.

After the blood was poured in there was a wait of from approx. 10 seconds to 300 seconds until the examination chamber was filled or substantially filled with the blood to be examined due to the capillary action. The filling procedure and the flow behavior of the blood in the chamber were monitored visually. It is also possible to monitor the filling procedure by means of a camera, optionally with storage of the electronic image information in a storage device or on a storage medium.

The microfluidic array can have one or more barcodes and/or inscriptions and/or RFID elements in addition to the unique assignment and/or identification and/or tracking.

During the monitoring of the filling procedure, it was generally likewise determined whether the filling procedure met predetermined criteria, for example whether a bubble-free filling, or only bubbles below a defined quantity and/or number, particular formation of the liquid front, speed of the liquid front, e.g. homogeneous distribution of the fluorescence signals or fluorescence signals in the expected local region, fluorescence intensity, fluorescence spectrum etc. was effected.

The evaluation was first carried out visually. Alternatively, an evaluation can be effected by means of automated image evaluation devices. Here, machine algorithms, in particular self-learning machine algorithms, which algorithms improve themselves in particular by recursion and/or expand their function, can also be used.

The observation, image acquisition and/or the evaluation can be effected both outside the measuring device or measuring arrangement and inside the measuring arrangement. The result of the evaluation was documented in each case. If the criteria were not met, the measurement was manually or automatically aborted.

Following this, the actual image acquisition of the sample was effected inside the sample chamber to examine, for example, the specific number and/or the shape of the blood components, for example the specific shape of sickle cells and/or the presence of DNA in cells and/or the absence of particular blood components and/or the ratio of the number of different blood components, in particular blood cells, to one another in the sample chamber.

Furthermore, specific staining methods can also be used, such as for example the Giemsa stain known to a person skilled in the art, which is used to distinguish various cell types from each other. The Giemsa solution used for this consists of a mixture of the dyes Azure A eosinate, Azure B eosinate, methylene blue eosinate and methylene blue chloride in methanol with glycerol as stabilizer.

Further histological stains and/or reactions are known to a person skilled in the art.

Here, specific illumination methods can furthermore be used depending on the object. Illuminations by means of monochromatic light or light of a specific spectral range, or combinations thereof, are possible.

The illumination can be effected in reflected light and/or in transmitted light. It is also possible to switch various illuminations in different positions on and off and/or to vary the illumination positions (moving the illumination, bright field, dark field). It is also possible to illuminate from a lateral position (shallow angle between 60° and 0° in relation to the horizontal or horizontally) e.g. in order to generate shadow images etc.

The image acquisition can be effected by means of high-resolution cameras, microscopes with built-in/fitted cameras or also by direct contact with an image chip (image acquisition without imaging components). The image acquisition is effected in the wavelength range of the irradiated light and/or at the wavelength or wavelengths of the emitted light if the emitted light has a different wavelength from the irradiated light (e.g. by using materials as upconverters and/or downconverters).

In the case of microscopes, a technique is preferably used in which partial images of the sample chamber are first acquired, which are then combined to form an overall image via image processing programs. The observation and/or the evaluation can also be effected by trained personnel by means of microscopy inspection.

During the blood analysis, the specific number and/or the shape of the blood components, for example the specific shape of sickle cells and/or the presence of DNA in cells and/or the absence of particular blood components and/or the ratio of the number of different blood components, in particular blood cells, to one another are, for example, detected. The blood components can be stained, for example, with fluorescent dyes.

Then, an image evaluation is effected, optionally by comparing images from different acquisition techniques/illuminations according to methods known to a person skilled in the art.

The result of the evaluation was documented and output as analysis result in analog or digital form. Where appropriate, the results are also transmitted in encrypted or unencrypted form to locally available or remote display devices, in particular via networks (wireless, wired).

Incompletely filled analysis chambers, sites with microstructures, air bubbles can be detected in corresponding evaluation methods and taken into account in the evaluation.

Once the analysis had been completed, the microfluidic array was disposed of properly, together with the sample contained therein.

LIST OF REFERENCE NUMBERS

F fluid to be examined
1 microfluidic array
2 base ply
3 base layer
4 flow channel
9 cover ply
10, 10' cover layer
11, 11' first adhesive layer
13*e*, 13*e*' structural element (elevation)
13*v* structural element (depression)
14, 14', 14" first varnish layer
15, 15', 15" transfer film
17, 17' transfer ply
20, 20' first carrier ply
21 first carrier film
22 first detachment layer
30 first region
31 second region
41 inlet
42 outlet
71 hot-stamping die

The invention claimed is:

1. A method for producing a microfluidic array comprising at least one flow channel covered at least in regions, in fluid connection with at least one inlet and at least one outlet, wherein the method comprises the following steps:

a) providing at least one base ply, b) providing at least one flexible cover ply, comprising at least one structural element, which is arranged on a surface of at least one side of the cover ply, and c) arranging the at least one flexible cover ply on at least one partial region of the at least one base ply, with the result that at least one partial region of the at least one base ply is arranged on at least one partial region of the at least one structural element arranged on the surface of at least one side of the cover ply to form at least one flow channel covered at least in regions, wherein the at least one flexible cover ply comprises a cover layer made of at least one replication varnish, wherein the at least one structural element is arranged on a surface of at least one side of the cover layer.

2. The method according to claim 1, wherein the at least one base ply is stiff.

3. The method according to claim 1, wherein the at least one base ply reveals a thickness of at least 200 um.

4. The method according to claim 1, wherein the at least one base ply has a modulus of elasticity of greater than 1000 MPa, determined in accordance with DIN EN ISO 527-3 (issue date: 2003-07).

5. The method according to claim 1, wherein the at least one base ply is, at least in regions, transparent to electromagnetic radiation.

6. The method according to claim 1, wherein the at least one base ply is composed of at least one polymer, at least one glass, at least one metal, at least one semiconductor material or a combination thereof.

7. The method according to claim 1, wherein the at least one base ply is a CCD sensor or a CMOS sensor.

8. The method according to claim 1, wherein the at least one base ply has macroscopic structures with a minimum structure size of greater than 10 μm, the macroscopic structures being selected from the group consisting of inlet, outlet, through-hole, depression, bulge, wall element, channel element, pre-chamber, mixing chamber, collection chamber, analysis chamber or combinations thereof.

9. The method according to claim 1, wherein the at least one base ply has at least one decorative element, wherein the at least one decorative element influences the surface texture, and/or the color of the surface, of the at least one base ply.

10. The method according to claim 9, wherein the at least one decorative element is formed, at least in regions, as a decorative layer.

11. The method according to claim 1, wherein the at least one flexible cover ply reveals a maximum thickness of at most 250 μm.

12. The method according to claim 1, wherein the at least one flexible cover ply has a modulus of elasticity in tension of from 100 MPa to 4000 MPa, in each case determined in accordance with DIN ISO 527 Part 3 (issue date: 2003-07).

13. The method according to claim 1, wherein at least one first adhesive layer is arranged on the side of the cover layer having the at least one structural element.

14. The method according to claim 1, wherein the at least one flexible cover ply furthermore has at least one decorative element, wherein the at least one decorative element influences the surface texture, and/or the color of the surface, of the at least one flexible cover ply.

15. The method according to claim 14, wherein the at least one decorative element is formed, at least in regions, as a decorative layer.

16. The method according to claim 1, wherein the at least one structural element has a height of at most 500 μm.

17. The method according to claim 1, wherein the at least one structural element is formed of at least one raised element on a surface of the flexible cover ply and/or of an at least one depression in a surface of the flexible cover ply.

18. The method according to claim 1, wherein the at least one flexible cover ply is, at least in regions, transparent to electromagnetic radiation.

19. The method according to claim 1, wherein the at least one flexible cover ply furthermore comprises at least one additive.

20. The method according to claim 19, wherein the at least one additive is arranged soluble in and/or on the cover ply.

21. The method according to claim 19, wherein the at least one additive is arranged in at least one first varnish layer.

22. A method for producing a microfluidic array comprising at least one flow channel covered at least in regions, in fluid connection with at least one inlet and at least one outlet, wherein the method comprises the following steps:

a) providing at least one base ply, b) providing at least one flexible cover ply, comprising at least one structural element, which is arranged on a surface of at least one side of the cover ply, and c) arranging the at least one flexible cover ply on at least one partial region of the at least one base ply, with the result that at least one partial region of the at least one base ply is arranged on at least one partial region of the at least one structural element arranged on the surface of at least one side of the cover ply to form at least one flow channel covered at least in regions, wherein at least one cover ply is provided in the form of a transfer film, wherein the transfer film furthermore has at least one first carrier ply, which is arranged detachably on the side of the at least one cover ply lying opposite the at least one structural element.

23. The method according to claim 22, wherein the at least one first carrier ply comprises at least one first carrier film made of a polyester, a polyolefin or a combination thereof.

24. The method according to claim 22, wherein the at least one first carrier ply furthermore comprises at least one first detachment layer, which is arranged on the side of the first carrier ply facing the cover ply.

25. The method according to claim 24, wherein the at least one first detachment layer comprises at least one wax, at least one silicone, at least one polyurethane or a combination thereof.

26. The method according to claim 22, wherein the at least one flexible cover ply comprises a cover layer made of at least one replication varnish, wherein the at least one structural element is arranged on a surface of at least one side of the cover layer.

27. The method according to claim 26, wherein, in step c) the at least one, base ply is arranged undetachably on the cover layer.

28. A method for producing a microfluidic array comprising at least one flow channel covered at least in regions, in fluid connection with at least one inlet and at least one outlet, wherein the method comprises the following steps:

a) providing at least one base ply, b) providing at least one flexible cover ply, comprising at least one structural element, which is arranged on a surface of at least one side of the cover ply, and c) arranging the at least one flexible cover ply on at least one partial region of the at least one base ply, with the result that at least one partial region of the at least one base ply is arranged on at least one partial region of the at least one structural element arranged on the surface of at least one side of the cover ply to form at least one flow channel covered at least in regions, wherein the at least one cover ply is provided in the form of a transfer film, wherein the transfer film furthermore has at least one carrier ply, which is arranged non-detachably on the side of the at least one cover ply lying opposite the at least one structural element.

* * * * *